ized |

United States Patent
Manion et al.

(10) Patent No.: US 9,436,580 B2
(45) Date of Patent: Sep. 6, 2016

(54) ANALYTICS FOR MOBILE APPLICATIONS

(71) Applicant: Ensighten, Inc., San Jose, CA (US)

(72) Inventors: Joshua Ryan Manion, Los Altos, CA (US); Joshua C. Goodwin, Cupertino, CA (US); Scott David Price, Chicago, IL (US); Miles A. Alden, Los Gatos, CA (US); Zackary Dean Ulrich, San Francisco, CA (US); Arthur C. Yin, San Jose, CA (US); Jeremy P. Woska, Seattle, WA (US); Gautam B. Amin, Chicago, IL (US); Manudath Gurudatha, Milpitas, CA (US); Jonathan David Chicquette, Normandy Park, WA (US)

(73) Assignee: Ensighten, Inc., San Jose, CA (US)

( * ) Notice: Subject to any disclaimer, the term of this patent is extended or adjusted under 35 U.S.C. 154(b) by 26 days.

(21) Appl. No.: 14/672,718

(22) Filed: Mar. 30, 2015

(65) Prior Publication Data

US 2016/0085658 A1 Mar. 24, 2016

Related U.S. Application Data

(63) Continuation of application No. 14/490,268, filed on Sep. 18, 2014, now Pat. No. 8,997,081.

(51) Int. Cl.
*G06F 9/44* (2006.01)
*G06F 11/36* (2006.01)
*G06F 9/45* (2006.01)
*G06F 9/445* (2006.01)

(52) U.S. Cl.
CPC .............. *G06F 11/36* (2013.01); *G06F 8/41* (2013.01); *G06F 8/54* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,389,592 B1 * | 5/2002 | Ayres et al. | 717/172 |
| 8,099,472 B2 | 1/2012 | Mahaffey et al. | |
| 8,180,376 B1 * | 5/2012 | Merritt | 455/456.3 |
| 8,296,643 B1 | 10/2012 | Vasilik | |
| 8,559,605 B2 * | 10/2013 | Forney | H04M 3/22 379/88.22 |
| 8,656,380 B1 * | 2/2014 | Sgeirsson et al. | 717/158 |

(Continued)

OTHER PUBLICATIONS

Webpage: http://apptimize.com, 12 pgs., downloaded from Internet on Oct. 7, 2014.

(Continued)

*Primary Examiner* — Daxin Wu
(74) *Attorney, Agent, or Firm* — Banner & Witcoff, Ltd.

(57) ABSTRACT

A tag delivery network is disclosed for delivering tags to collect analytics related to use of mobile applications. The tag delivery network may include multiple servers for communicating with mobile devices executing mobile applications. The mobile applications may be any mobile application that has been recompiled with, for example, a particular line of code and a static library. A recompiled mobile application may initiate a browser when executed by a mobile device. The tag delivery network may deliver a tag container to the browser. The tag container may load a bootstrap file which in turn may load one or more rule files and code files. These files may cause the mobile device to modify an appearance of the mobile application. The modification may be performed to carry out multivariate testing (e.g., A/B testing), content swapping, optimization of the mobile application, or personalization of the mobile application.

20 Claims, 9 Drawing Sheets

(56) References Cited

U.S. PATENT DOCUMENTS

| | | | |
|---|---|---|---|
| 2004/0015954 A1* | 1/2004 | Tuerke et al. | 717/173 |
| 2006/0177023 A1 | 8/2006 | Vaghar et al. | |
| 2006/0177025 A1 | 8/2006 | Frifeldt et al. | |
| 2008/0198981 A1 | 8/2008 | Skakkebaek et al. | |
| 2009/0241104 A1* | 9/2009 | Amiga et al. | 717/174 |
| 2010/0293458 A1* | 11/2010 | Rolleston et al. | 715/274 |
| 2011/0313874 A1* | 12/2011 | Hardie et al. | 705/26.1 |
| 2013/0117445 A1 | 5/2013 | Bhat et al. | |
| 2013/0159984 A1* | 6/2013 | Misovski | G06F 8/60 717/168 |
| 2013/0205277 A1 | 8/2013 | Seven et al. | |
| 2013/0219307 A1* | 8/2013 | Raber et al. | 715/763 |
| 2013/0247030 A1* | 9/2013 | Kay | H04L 67/34 717/178 |
| 2013/0262617 A1* | 10/2013 | Ligman et al. | 709/217 |
| 2013/0262658 A1* | 10/2013 | Athale | 709/224 |
| 2013/0290095 A1 | 10/2013 | Crinon | |
| 2014/0024339 A1* | 1/2014 | Dabbiere et al. | 455/406 |
| 2014/0089782 A1* | 3/2014 | Cook | 715/234 |
| 2014/0108440 A1* | 4/2014 | Nos | 707/758 |
| 2014/0143252 A1 | 5/2014 | Silverstein et al. | |
| 2014/0223423 A1* | 8/2014 | Alsina et al. | 717/173 |
| 2014/0258383 A1 | 9/2014 | Milne | |
| 2015/0143344 A1* | 5/2015 | Davis | 717/129 |

OTHER PUBLICATIONS

Webpage: http://docs.vessel.io/ab-assets/, 5 pgs, downloaded from Internet on Oct. 7, 2014.
Webpage: http://docs.vessel.io/ab-checkpoints/, 3 pgs., downloaded from Internet on Oct. 7, 2014.
Webpage: http://docs.vessel.io/ab-filters/, 3 pgs., downloaded from Internet on Oct. 7, 2014.
Webpage: http://docs.vessel.io/ab-messaging-test/, 3 pgs., downloaded from Internet on Oct. 7, 2014.
Webpage: http://docs.vessel.io/ab-onboarding/, 3 pgs., downloaded from Internet on Oct. 7, 2014.
Webpage: http://docs.vessel.io/ab-sessions/, 3 pgs., downloaded from Internet on Oct. 7, 2014.
Webpage: http://docs.vessel.io/ab-user-tracking/, 4 pgs., downloaded from Internet on Oct. 7, 2014.
Webpage: http://docs.vessel.io/add-test-devices/, 4 pgs., downloaded from Internet on Oct. 7, 2014.
Webpage: http://docs.vessel.io/awarding-ab-testing/, 5 pgs., downloaded from Internet on Oct. 7, 2014.
Webpage: http://docs.vessel.io/beta-kill-switch/, 5 pgs., downloaded from Internet on Oct. 7, 2014.
Webpage: http://docs.vessel.io/configure-test/device/, 5 pgs., downloaded from Internet on Oct. 7, 2014.
Webpage: http://docs.vessel.io/creating-ab-test/, 5 pgs., downloaded from Internet on Oct. 7, 2014.
Webpage: http://docs.vessel.io/define-ab-test-controls/, 5 pgs., downloaded from Internet on Oct. 7, 2014.
Webpage: http://docs.vessel.io/downloads/, 4 pgs., downloaded from Internet on Oct. 7, 2014.
Webpage: http://docs.vessel.io/game-style-test/, 12 pgs., downloaded from Internet on Oct. 7, 2014.
Webpage: http://docs.vessel.io/getting-started/, 5 pgs., downloaded from Internet on Oct. 7, 2014.
Webpage: http://docs.vessel.io/how-it-works/, 5 pgs., downloaded from Internet on Oct. 7, 2014.
Webpage: http://docs.vessel.io/integrate/, 3 pgs., downloaded from Internet on Oct. 7, 2014.
Webpage: http://docs.vessel.io/jenkins-plugin, 6 pgs., downloaded from Internet on Oct. 7, 2014.
Webpage: http://docs.vessel.io/pausing-ab-testing/, 4 pgs., downloaded from Internet on Oct. 7, 2014.
Webpage: http://docs.vessel.io/ready-for-ios7/, 5 pgs., downloaded from Internet on Oct. 7, 2014.
Webpage: http://docs.vessel.io/starting-ab-testing/, 5 pgs., downloaded from Internet on Oct. 7, 2014.
Webpage: http://docs.vessel.io/landing-screen-test/, 7 pgs., downloaded from Internet on Oct. 7, 2014.
Webpage: http://www.ensighten.com, Ensighten Mobile, 4 pgs., downloaded from Internet on Oct. 7, 2014.
Webpage: https://www.vessel.io/how-it-works/, 5 pgs., downloaded from Internet on Oct. 7, 2014.
Webpage: https://www.vessel.io/, 4 pgs., downloaded from Internet on Oct. 7, 2014.
Webpage: https://www.leanplum.com/, 5 pgs., downloaded from Internet on Oct. 8, 2014.
Dec. 14, 2015—(WO) International Search Report—App PCT/US2015/050600.

* cited by examiner

ANALYTICS FOR MOBILE APPLICATIONS

CROSS-REFERENCE TO RELATED APPLICATIONS

This application is a continuation of and claims priority to U.S. patent application Ser. No. 14/490,268, filed on Sep. 18, 2014 (and to issue on Mar. 31, 2015 as U.S. Pat. No. 8,997,081), which is hereby incorporated by reference in its entirety.

TECHNICAL FIELD

Aspects of the disclosure generally relate to configuring a mobile application to collect analytics and using the collected analytics. In particular, various aspects of the disclosure discuss features of a system that performs multivariate testing for a mobile application, content swapping for a mobile application, optimization of a mobile application based on test results, and/or personalization of a mobile application.

BACKGROUND

In the field of web analytics, website owners and/or third party vendors collect data when users visit websites. Such data may include information about visitors (e.g., visitor names, visitor ages, visitor demographics, etc.), where visitors are located, how well the website performs (e.g., page load times), and how a visitor interacts with the website (e.g., mouse-overs, mouse-clicks, and other events indicating visitor behavior). Tags may be placed on web pages to facilitate collection of the data. Once collected, the data may be used for various purposes, such as marketing. For example, a marketing team may use web analytics to determine how to improve a website to increase traffic and/or generate more sales.

As mobile devices (e.g., smartphones, tablets, etc.) become increasingly popular, more and more organizations (e.g., businesses) are using mobile applications to connect with people (e.g., customers, users, etc.). Mobile applications are applications designed to run on mobile devices. Mobile devices typically have less processing power and smaller screens than other computing devices, and therefore, have specially designed operating systems for running specially designed applications. Examples of operating systems for mobile devices include ANDROID (provided by Google) and iOS (provided by Apple).

As mentioned, mobile applications, like web pages, are used to connect organizations with people. As such, organizations may desire to collect analytics similar to web analytics but related to the use of mobile applications. For example, organizations may be interested in obtaining information about users of their mobile applications (e.g., user names, user ages, user demographics, etc.), where users are located, how well their mobile applications perform (e.g., whether a mobile application crashes or freezes, how long a mobile application takes to provide information or images, etc.), and how users interact with their mobile applications (e.g., where users click, where users mover their mouse, etc.). Such analytics may be obtained by placing code in mobile applications to capture data and transmit the data to a backend system.

Once analytics related to mobile applications are obtained, it may be challenging to use the analytics to improve the mobile applications. Unlike web pages which may be readily modified, mobile applications are installed on and executed by mobile devices that are controlled by users. That is, organizations that produce mobile applications generally do not have control over the mobile devices that are running their mobile applications. Without access to the mobile devices, an organization may have difficulty providing a modified version of its mobile application, such as a version that is modified in light of analytics. An organization may attempt to modify its mobile application by sending updates or inviting users to re-install a modified version of the mobile application, but these efforts generally require the cooperation of users and/or third party entities. For example, an organization wishing to offer an updated or modified version of its mobile application may have to submit the modified version or software development kit (SDK) to an online "app store" (e.g., Apple Store, Google Play, etc.) for registration and approval. The online app store may take days, weeks, or months, to approve the modified version or SDK. Then, assuming the modified version or SDK is approved, there may be an additional delay before the modified version or SDK even appears on the online "app store." There may be an even further delay because an end user may still need to download and install the modified version (which may include overwriting or uninstalling the previous (or unmodified) version of the mobile application) or SDK.

The time it may take to deliver the modified version of a mobile application or SDK may deter some organizations from releasing modified versions or SDKs for marketing purposes. In particular, obstacles to releasing the modified versions of a mobile application or SDKs for a mobile application may keep some organizations from implementing analytics solutions, such as multivariate testing and/or content swapping with respect to their mobile applications.

Multivariate testing may refer to the modifying of elements on a page or interface to create different versions of the page or interface for testing how users react to the different versions. An objective of multivariate testing may be to determine which version of a page or interface produces, for example, the most sales or most clicks. One example of multivariate testing is sometimes referred to as A/B testing. In A/B testing, two versions (version A and version B) of a page or interface are provided (e.g., randomly) to different users to see which version provides the best results. For example, A/B testing may include providing a web page with a blue background to some visitors and the same web page with a white background to other visitors. Then, behavioral results (e.g., number of sales, how long users remained on the web page, how many mouse-over events (or other events) occurred, etc.) associated with the two backgrounds may be compared to determine which background is more favorable. Organizations providing mobile applications may wish to perform similar multivariate testing for their mobile applications; however, they might not want to resubmit their mobile applications to mobile stores and/or want to employ or hire programmers to develop the different tests. Further, organizations may want to perform content swapping to change the appearance of their mobile application. However, again, they might not want to resubmit their mobile applications to mobile stores and/or want to employ or hire programmers just to make changes in appearance.

In light of the above, it should be understood that there may be a demand among, for example, organizations providing mobile applications to readily make changes to their analytics solutions without having to recompile mobile applications and resubmit mobile applications or submit SDKs to an "app store." In other words, there may be a demand for a tool that performs tag changes in real-time without application code modification. In particular, there may be a demand to perform multivariate testing or content swapping for a mobile application, and to optimize and/or personalize mobile applications based on results of the multivariate testing and/or user profiles. For example, there may be a demand to change ad strategies or A/B test ad strategies in real-time as well as to trigger different ad strategies based on conditional logic (e.g., user interests or user preferences, geography, application usage, time, battery life, etc.).

BRIEF SUMMARY

Aspects of the disclosure address one or more of the issues mentioned above by disclosing methods, computer readable media, and apparatuses associated with a tag delivery network that delivers tags to collect analytics related to use of mobile applications. Once a mobile application is modified in accordance with aspects disclosed herein (e.g., a particular line of code is inserted into the mobile application and access to a particular library is given to the mobile application) and recompiled, users (e.g., businesses) may implement various analytics solutions with respect to their mobile applications without resubmitting their mobile applications to online "app stores." In one example, a user (e.g., marketing personnel of a business) may access a user interface to establish a multivariate test (e.g., A/B test) for a mobile application. An application programming interface of the tag delivery network may interface with the user interface to publish code that implements the multivariate test. When the mobile application is executed on a mobile device, a browser is launched to load files so that the multivariate test is implemented. The files may cause the appearance of the mobile application to change without changing the compiled code of the mobile application. For example, during runtime, the library may run other functions defined by the files in place of functions of the compiled code in order to change the appearance of the mobile application. The files may also employ tags for the collection of analytics representing results of the multivariate test without changing the code of the mobile application. Because the code of the mobile application is not changed, it might not be necessary to resubmit the mobile application to an online "app store." As such, modification and tagging of mobile applications in real-time may be achieved.

In accordance with aspects of the present disclosure, a system may include a plurality of servers electrically connected to a network. At least one of the servers may be configured to communicate with a mobile device (e.g., a smartphone, tablet, etc.) executing a mobile application. Communications may be transferred via any network or combination of networks (e.g., Internet, cellular network, etc.) using any protocol (e.g., TCP/IP). Also at least one of the servers may be configured to send (or deliver) a tag container to a hidden browser executed by the mobile device; send a bootstrap file to the hidden browser; and send at least one file, comprising instructions, to the hidden browser. The instructions may be configured to cause the mobile device to modify an appearance of the mobile application. For example, the instructions may be configured to cause the mobile device to implement a multivariate test (e.g., A/B test) within the mobile application. The change in appearance may occur without changing code (e.g., source code) of the mobile application. The at least one file may include one or more rule files that, when executed by the mobile device (e.g., hidden browser running thereon), determine which version, if any, of a multivariate test is to be used in modifying the appearance of the mobile application. In another example, the instructions may be configured to cause the mobile device to swap content of the mobile application (e.g., change an ad strategy of the mobile application). In yet another example, the instructions may be configured to cause the mobile device to modify the appearance of the mobile application in accordance with an optimal configuration (which may be determined by analyzing results of a multivariate test). Still, in another example, the instructions may be configured to cause the mobile device to modify the appearance of the mobile application based on a user profile associated with a user of the mobile application. The user profile may be stored in memory within one or more of the servers of the system.

In accordance with additional aspects of the disclosure, a method of configuring a mobile application to allow for real-time tagging and implementation of analytics solutions is provided. The method may comprise: inserting code into a compiled mobile application; adding a library file to the compiled mobile application; and recompiling, by a computing device (e.g., server), the compiled mobile application after inserting the code and adding the library file. The library file may comprise at least one instruction that is executed in response to launching the recompiled mobile application on a device (e.g., a mobile device). When executed, the at least one instruction of the library may cause the device to launch a browser that loads at least one file to modify an appearance of the recompiled mobile application. For example, if a user (e.g., marketing personnel) accesses a user interface to establish a multivariate test, the appearance of the recompiled mobile application may be modified to implement the multivariate test.

In accordance with further aspects of the disclosure, one or more non-transitory computer readable storage media storing computer-executable instructions are provided. When executed by a computing device, the computer-executable instructions may cause the computing device to: in response to a request from a browser initiated upon execution of a mobile application by a mobile device, send or deliver a tag container to the browser; and in response to a request from the tag container, send or deliver one or more files to the browser, the one or more files configured to cause the mobile device to modify an appearance of the mobile application. The one or more files may be configured to cause the mobile device to change a color of a background of the mobile application, change a color of an object of the mobile application, change a characteristic of a font used in the mobile application, change a layout of a page in the mobile application, change a position of an object in the mobile application, etc. In one example, the one or more files may comprise at least one opcode that maps an event to at least one event handler function (which may be, for example, a JAVASCRIPT function) configured to collect analytics of a multivariate test and to fire a tag in response to use of the mobile application. Also the one or more files may comprise code that is injected into the mobile application to modify the appearance of the mobile application based on a user profile.

This summary is provided to introduce a selection of concepts in a simplified form that are further described below in the detailed description. The summary is not intended to identify key features or essential features of the claimed subject matter, nor is it intended to be used to limit the scope of the claimed subject matter. Moreover, one or more of the steps and/or components described above may be optional or may be combined with other steps.

BRIEF DESCRIPTION OF FIGURES

The present disclosure is illustrated by way of example and is not limited by the accompanying figures in which like reference numerals indicate similar elements.

DETAILED DESCRIPTION

Figure 1:
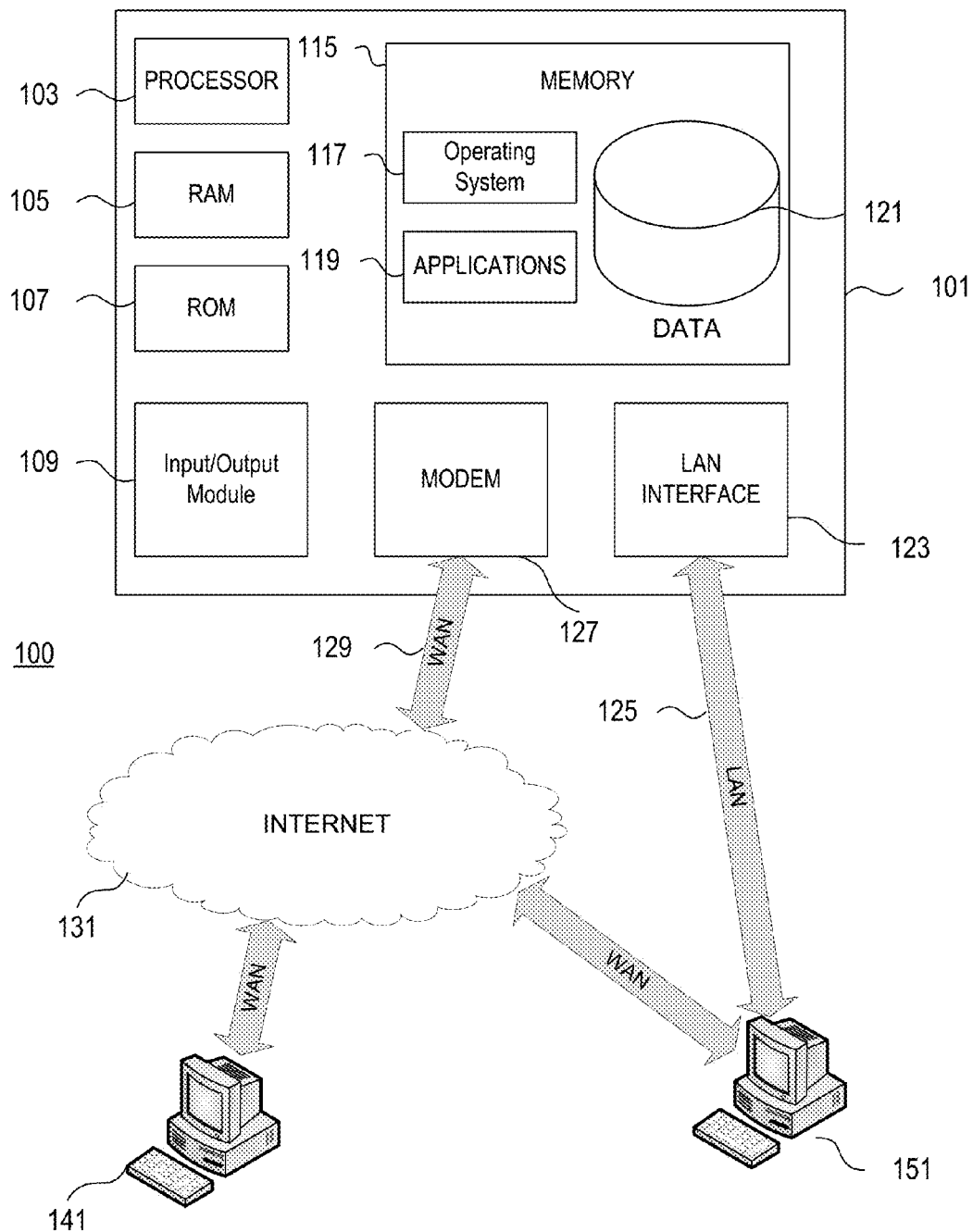
FIG. 1 is a diagram of an example computing device in an illustrative operating environment in which various aspects of the disclosure may be implemented.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Aspects of the present disclosure relate to analytics for mobile applications. A mobile application may include any application or program (e.g., application providing a game, word processing, photo-editing, data sharing, etc.) that is specially designed for execution on a mobile device (e.g., a smartphone, tablet, etc.) running an operating system specially designed for mobile devices. Aspects of the present disclosure may be implemented by adding specific code to the source code of an existing mobile application. This code may be a single line (or one line) of code. In some embodiments, the single line of code may be written using the Objective-C programming language. In particular, the single line of code may be written using the Objective-C programming language when it is to be incorporated into a mobile application built for the iOS operating system. In other embodiments, the single line of code may be written using other programming languages, such as the JAVA programming language, C, C++, etc. It should be understood that lines of code may be distinguished (or separated) by certain predefined characters, such as a semicolon (;), depending on the programming language used, and therefore, a single line of code may appear to be on multiple lines even though it is a single line of code.

The single line of code added to an existing mobile application may be static. That is, the single line of code might not be customized or undergo changes after deployment. As such, the same single line of code can be provided to different organizations for use in a variety of mobile applications. Although this single line of code is static, once compiled, it may allow both technical users (e.g., programmers) and non-technical users (e.g., marketing personnel) to customize analytics solutions via, for example, a web interface.

As will be discussed further below, aspects described herein relate to implementing customized analytics solutions, such as multivariate testing (e.g., A/B testing) and content swapping for a mobile application. An organization providing a mobile application may want to perform multivariate testing to determine how to improve the structure and/or appearance of their mobile application. An organization may create multiple versions of their mobile application and deploy them using the systems, devices, methods, and software disclosed herein to perform multivariate testing. Further, the systems, devices, methods, and software disclosed herein allow for the collection of analytics for analysis of the multivariate testing. Moreover, the systems, devices, methods, and software disclosed herein may be used to perform the analysis of a multivariate test and provide results of the multivariate testing. For example, the systems, devices, methods, and software disclosed herein may identify which version of the mobile application provides the user experience that is most favorable to an organization providing the mobile application.

In addition, systems, devices, methods, and software disclosed herein may perform content swapping. Content swapping may be done on the basis of test results, such as multivariate test results. For example, if results of a multivariate test indicate that a particular version tested or a combination of multiple versions tested may be more favorable than a current version of the mobile application, aspects of the disclosure may facilitate the swapping of content (e.g., elements, objects, etc.) of the mobile application in accordance with the test results. Content swapping may also be performed at the request of various personnel and divisions of an organization. For example, a marketing department may want to change an advertisement that appears within the mobile application, and therefore, may use the systems, devices, methods, and software to implement the change. In some embodiments, systems, devices, methods, and software may provide user interfaces that allow individuals (e.g., marketing personnel) without programming experience to implement multivariate testing and/or content swapping themselves.

Further, systems, devices, methods, and software disclosed herein may allow for personalization of a mobile application. Some mobile application users and mobile application providers may want to use/provide mobile applications that are customized (e.g., personalized) for a user. Personalization of a mobile application may be based on a variety of factors, including interests of a user, demographics of a user, geographical location of a user, etc. Factors may be stored in user profiles, which may be created, edited, and maintained using the systems, devices, methods, and software disclosed herein. Data included in the user profiles may be collected through various channels. For example, data may be collected from the users themselves. Users may enter data, such as their interests, that may be used in generating or updating a user profile. Alternatively, data of the user profiles may be based on analytics collected from use of the mobile application. Or, data of the user profiles may be based on analytics collected from use of other mobile applications or websites.

FIG. 1 depicts an illustrative operating environment in which various aspects of the present disclosure may be implemented. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include a computing device 101. In one or more embodiments, teachings of the present disclosure may be implemented with a computing device 101. The computing device 101 may have a processor 103 for controlling overall operation of computing device 101 and its associated components, including random-access memory (RAM) 105, read-only memory (ROM) 107, input/output (I/O) module 109, and memory 115.

Computing device 101 may include a variety of computer readable media. Computer readable media may be any available media that may be accessed by computing device 101, may be non-transitory, and may include volatile and nonvolatile, removable and non-removable media implemented in any method or technology for storage of information, such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Various aspects described herein may be performed by the computing device 101. Depending on the particular arrangement of components and/or data (e.g., computer-executable instructions) stored in memory of the computing device 101, the computing device 101 may function as a variety of computing devices disclosed herein. For example, the computing device 101 may execute a mobile application, and therefore, may function as a mobile device. Additionally, or alternatively, the computing device 101 may execute computer-executable instructions to receive mobile screen captures, and therefore, may function as a mobile application program interface server. Further, the computing device 101 may deliver files, such as a tag container, to a mobile device, and therefore, may function as a tag delivery network server. Also, the computing device 101 may manage tag delivery network files (e.g., rule files), and therefore, may function as a tag delivery network (TDN) manager.

Although not required, various aspects described herein may be embodied as a method, a data processing system, or as a computer-readable medium storing computer-executable instructions. For example, a computer-readable medium storing instructions to cause a processor 103 to perform steps of a method in accordance with aspects of the disclosed arrangements is contemplated. For example, aspects of the method steps disclosed herein may be executed on a processor 103 of computing device 101. Such a processor 103 may execute computer-executable instructions stored on a computer-readable medium (e.g., RAM 105, ROM 107, etc.).

I/O module 109 may include a microphone, keypad, touch screen, and/or stylus through which a user of computing device 101 may provide input, and may also include one or more of a speaker for providing audio output and a display device for providing a textual, audiovisual, and/or graphical output.

Software may be stored within memory 115 to provide instructions to processor 103 for enabling computing device 101 to perform various functions. For example, memory 115 may store software used by the computing device 101, such as an operating system 117 and application programs 119, and may include an associated database 121. An application program 119 used by the computing device 101 may include a computer-executable instructions for causing the computing device 101 to transmit program instructions and/or other data (e.g., code) to other computing devices 101. Also, some or all of the computer executable instructions for computing device 101 may be embodied in hardware or firmware. While applications are running on computing device 101, RAM 105 may store corresponding application data.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. In some embodiments, computing devices 141 or 151 may be a mobile device (e.g., a smartphone) communicating over a wireless carrier channel. Also, in some embodiments, the computing device 101 may be connected to the computing devices 141 or 151 to form a "cloud" computing environment.

The computing device 101 may include a local area network (LAN) interface 123 for communicating via a LAN connection 125 (which may be a wireless LAN (WLAN) connection, such as a Wi-Fi connection). The computing device 101 may also include a wide area network (WAN) interface 127, such as a modem, for communicating via a WAN connection 129, as well as other interfaces for communicating over other networks. In some embodiments, the WAN connection 129 may be used to communicate with other computing devices via a WAN 131, such as the Internet. The network connections shown are illustrative and other means of establishing a communications link between the computing devices may be used. Various well-known protocols such as transmission control protocol/Internet protocol (TCP/IP), Ethernet, file transfer protocol (FTP), hyper-text transfer protocol (HTTP), and the like may be used.

The disclosure is operational with numerous other general purpose or special purpose computing system environments or configurations, including distributed computing environments. Further, the computing device 101 may be similar to any of a variety of specially configured computing devices, such as a personal computer (e.g., a desktop computer), server, laptop computer, notebook, tablet, smartphone, consumer electronics, minicomputers, mainframe computers, etc. Also, the computing device 101 may have a rules module for performing methods and/or executing computer-executable instructions to generate rules and/or code for multivariate testing, content swapping, mobile application optimization, and/or personalization of a mobile application. The rules module may be implemented with one or more processors (which may be specially configured or may be a general processor 103) and one or more storage units (e.g., databases, RAM, ROM, and other computer-readable media), one or more application specific integrated circuits (ASICs), and/or other hardware components. In cases where one or more processors are used to implement the rules module, the one or more processors may be specially configured processors in addition to or in place of one or more general processors 103 or may be general processors 103 configured to execute a particular set of computer instructions.

The computing device 101 of FIG. 1 illustrates an example configuration. In some embodiments, the computing device 101 may include fewer or more elements. For example, the computing device 101 may be a mobile device (e.g., a smartphone, tablet, etc.), and thus, may also include various other components, such as a battery, speaker, and/or antennas (not shown). Also, the computing device 101 may be server of a server farm or server cluster and may include interfaces for linking the server with other servers of the server farm or server cluster.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
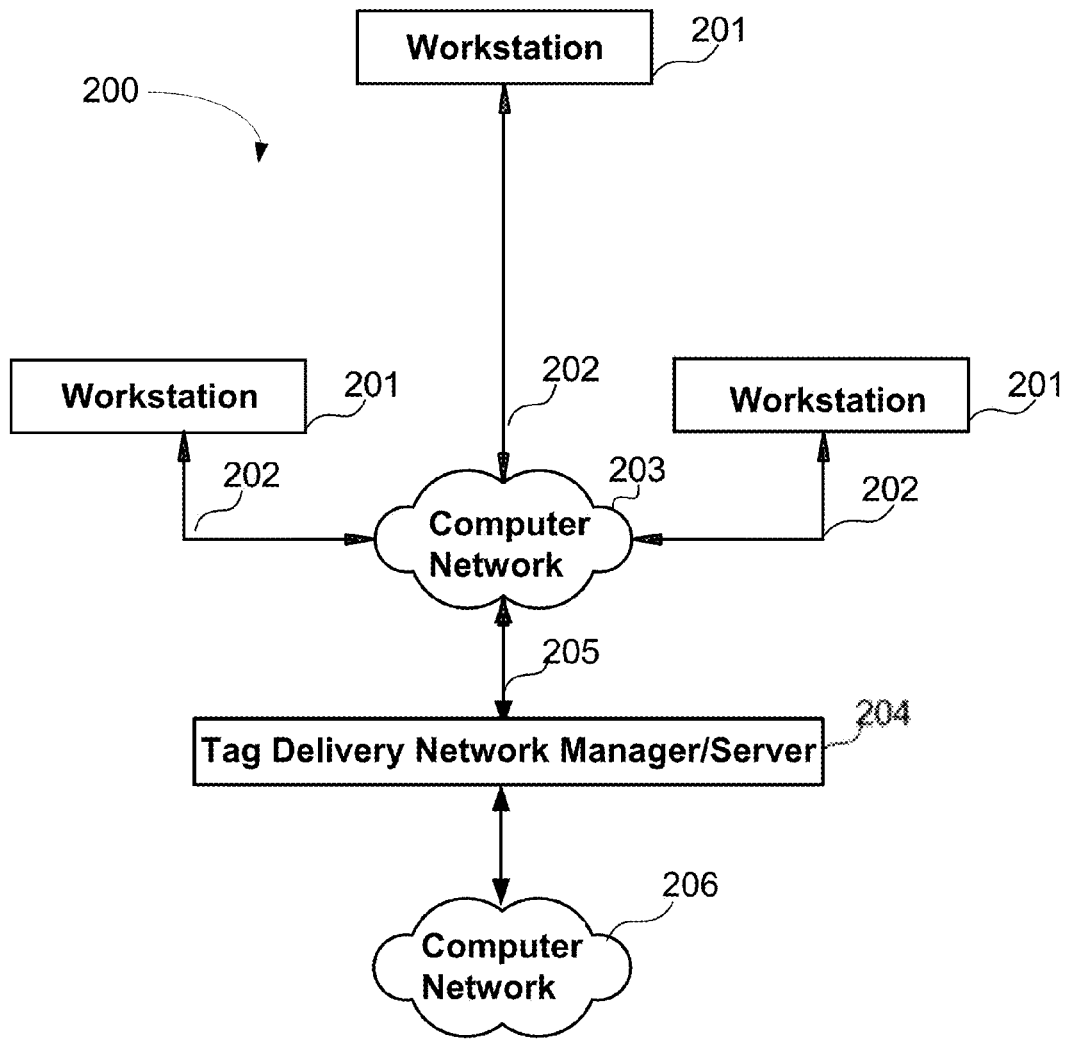
FIG. 2 is an illustrative diagram of workstations and servers that may be used to implement the processes and functions of various aspects of the disclosure.

FIG. 2 depicts an illustrative system 200 for implementing aspects (e.g., methods) according to the present disclosure. As illustrated in FIG. 2, the system 200 may include one or more workstations 201. The workstations 201 may be configured in a similar manner as the computing device 101 of FIG. 1. The workstations 201 may be local or remote, and may be connected by one or more communications links 202 to computer network 203 that is linked via communications links 205 to tag delivery network manager/server 204. In certain embodiments, workstations 201 may be different or separate storage/computing devices for storing and delivering client-specific program instructions or in other embodiments workstations 201 may be user terminals that are used to access a client website and/or execute a client-specific application. In system 200, manager/server 204 may be any suitable server, processor, computer, or data processing device, or combination of the same.

Computer networks 203 and 206 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and manager/server 204, such as network links, dial-up links, wireless links, hard-wired links, etc.

Figure 3:
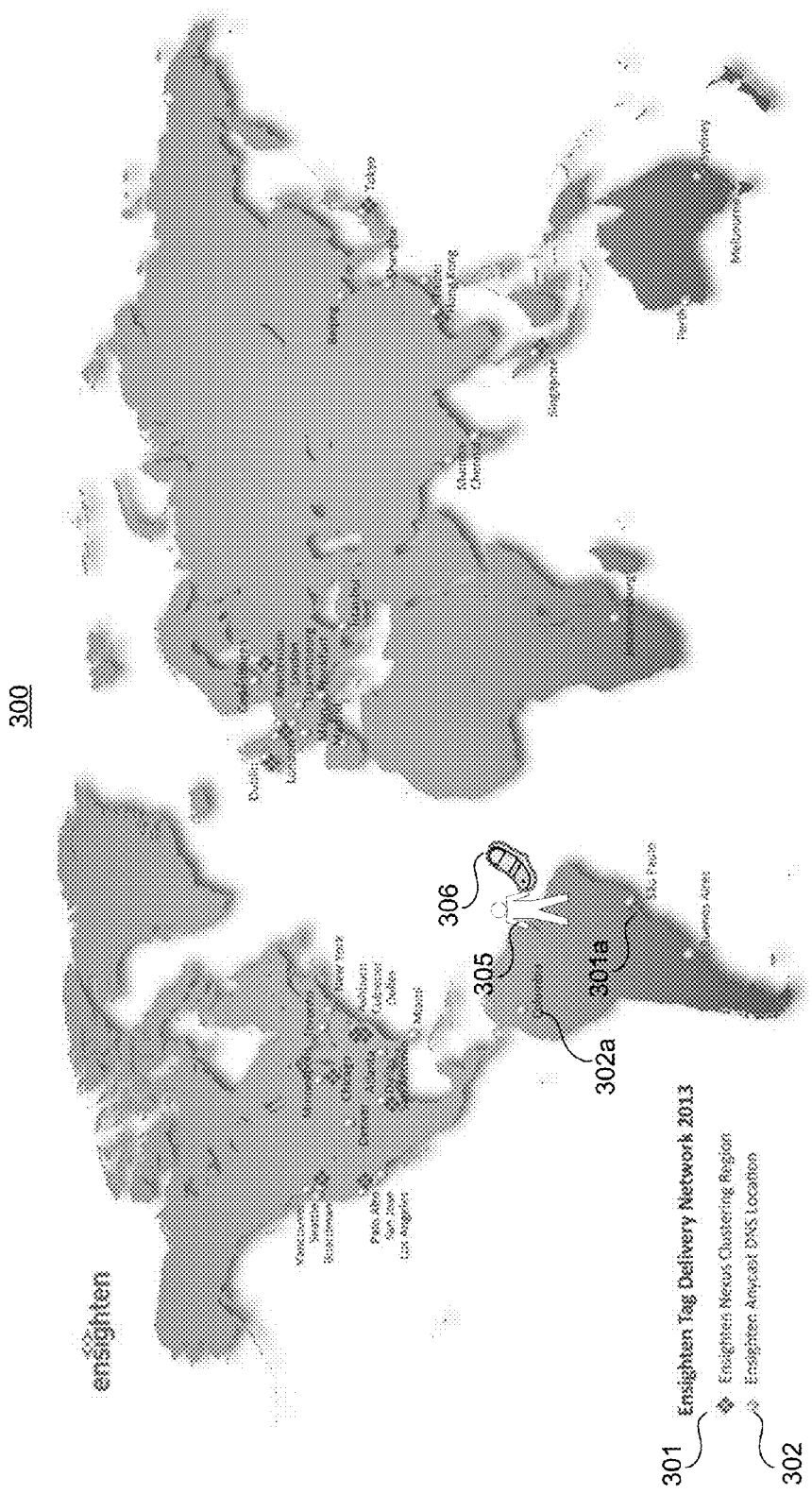
FIG. 3 is a diagram illustrating an example environment in accordance with various aspects of the present disclosure.

FIG. 3 illustrates an example environment 300 in which aspects of the present disclosure may be implemented. As shown in FIG. 3, the environment 300 may include a tag delivery network (TDN). The TDN may be a distributed system comprising several servers deployed in multiple locations (e.g., geographical locations, IP addresses, etc.). The TDN may be used to remotely serve content to end-users, while ensuring high performance and high availability. Thus, the TDN may advantageously enable remote storage of large content, which may be retrieved as necessary via the Internet. In some examples, the TDN may be capable of serving various content types (e.g., text, graphics, videos, scripts, etc.).

The TDN may be optimally configured to serve web scripts (e.g., HTML, JAVASCRIPT, PHP, etc.). The TDN may provide a fast, reliable, scalable cloud-based infrastructure for managing tags used to collect analytics. The TDN may be used to manage tags for both websites and mobile applications. For example, the TDN enables organizations (e.g., businesses) to collect and act on analytics indicating behavior of a user of a mobile application. It will be appreciated that the characteristics and capabilities attributed to a TDN by this disclosure may also be performed by other types of content delivery networks or content distribution networks (CDNs).

As shown in FIG. 3, the TDN comprises one or more servers and/or computing devices at one or more cluster regions 301 (also referred to as Ensighten Nexus Clustering Regions) and/or one or more domain name system (DNS) locations 302 (also referred to as Ensighten Anycast DNS locations). The cluster regions 301 and DNS locations 302 may be spread out across the globe. The locations of the cluster regions 301 and DNS locations 302 may be chosen based on population and/or expected network traffic. Accordingly, the locations may change over time. Also, locations may be added or deleted.

Each cluster region 301 may include one or more servers. Likewise, each DNS location 302 may include one or more servers. The one or more servers may be configured in a similar manner as the computing device 101 of FIG. 1. One or more of the servers in each DNS location 302 may enable translation of a domain name to an IP address of a server of a cluster region 301. For example, the domain name "nexus.ensighten.com" may translate to an IP address (e.g., IPv4, IPv6, etc.) of a server of a cluster region 301.

Accordingly, in some examples, a computing device 101 may request at least an IP address of one or more of the servers in the cluster regions 301 from one or more of the servers in the DNS locations 302, and subsequently retrieve content (e.g., files, scripts, etc.) from one or more of the servers in the cluster regions 301 using at least the server's IP address. Alternatively, the computing device 101 may directly retrieve content from in the cluster region 301 using at least the server's IP address. In some examples, the content retrieved from the servers may include the mobile bootstrap file and tag container described herein. FIG. 3 illustrates a person 305 operating a mobile device 306. The mobile device 306 may connect to the TDN through, for example, a server at the closest cluster region 301 or DNS location 302. In the example of FIG. 3, the mobile device 306 is shown as being connected to a server at the DNS location 302*a*. The mobile device 306 may receive an IP address of a server in cluster 301*a* from the server at the DNS location 302*a*, so the mobile device 306 may receive files, scripts, etc., such as the mobile bootstrap file and tag container described herein.

In some embodiments, each of the cluster regions 301 and DNS locations 302 may be assigned a geographical area, which may correspond to certain zip codes and/or area codes. The cluster regions 301 and DNS locations 302 may service computing devices 101 (e.g., mobile devices 306) within their assigned areas.

Additionally, or alternatively, the TDN may automatically perform load balancing to distribute traffic across its servers. For example, if the servers at the closest cluster region 301 to a particular mobile device are busy providing tags to a number of other mobile devices, the particular mobile device may be provided with tags from a server at another cluster region 301. In some examples, the TDN may perform load balancing at the DNS locations 302 to determine which server of which cluster region 301 should be referred to in the response to the requesting computing device 101. In such examples, load balancing may be based on a geographical location of the requesting computing device 101 and/or the health (which may be probed intermittently or periodically) of certain nodes (e.g., servers) in the various cluster regions 301. As such, the TDN may execute analytics solutions, like multivariate testing and content swapping, in a fast and reliable manner.

Figure 4:
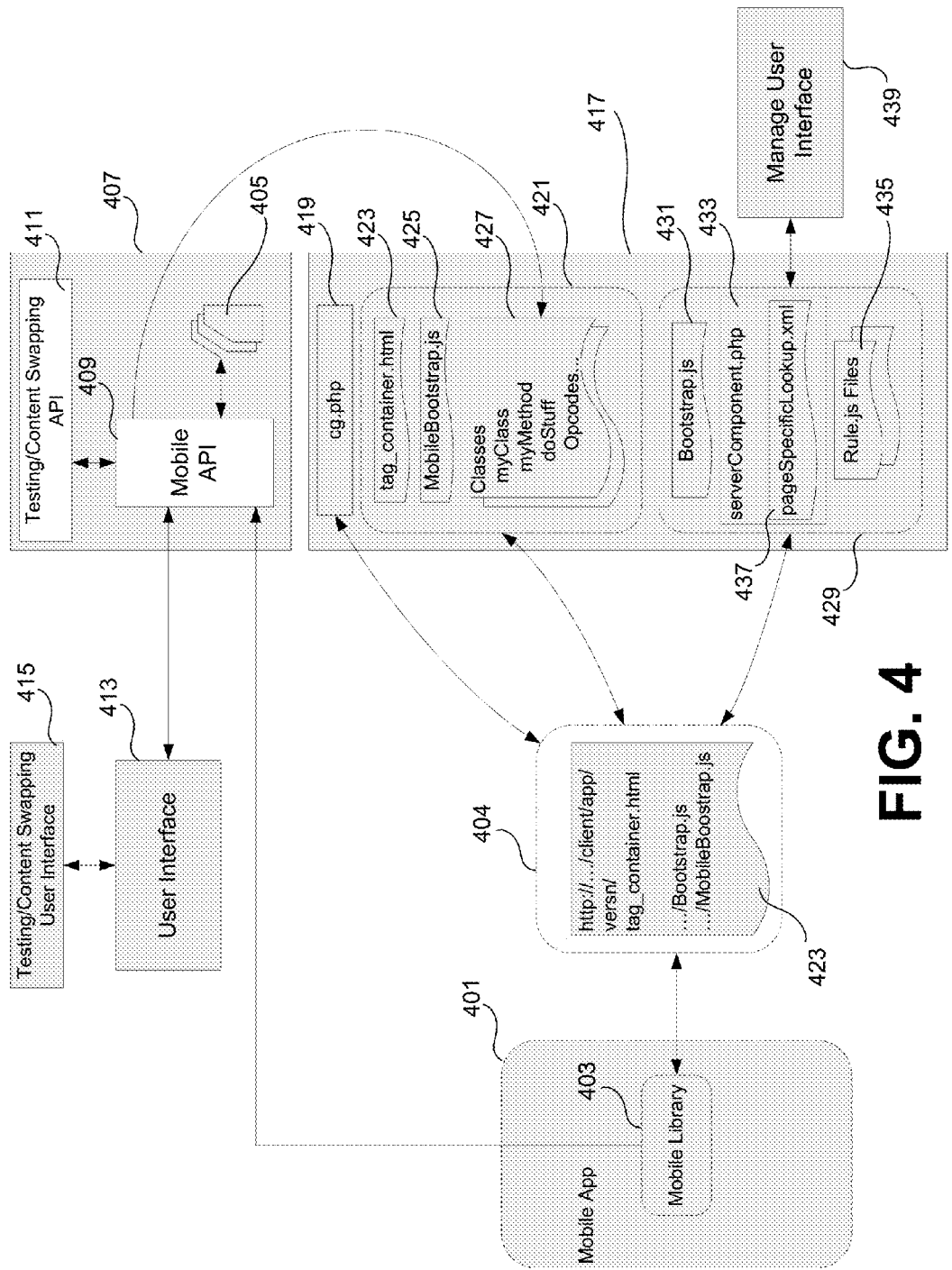
FIG. 4 is an illustrative logical architecture in accordance with various aspects of the present disclosure.

FIG. 4 illustrates an example logical architecture 400 which aspects of the present disclosure may be implemented. In particular, the logical architecture 400 may be used to collect analytics from mobile applications and allow users (e.g., personnel of the entity or entities managing the logical architecture or other organizations) to customize the collection of analytics. The logical architecture 400 may also allow users to perform multivariate testing, content swapping, optimization, personalization, and other functions to change a user experience with a mobile application. The same logical architecture 400 may be used by a plurality of organizations for a plurality of mobile applications.

As shown in FIG. 4, the logical architecture includes a mobile application 401. A mobile library (e.g., Ensighten Mobile Library) 403 may be included within (e.g., installed in) the mobile application 401. The mobile library 403 may be a static library that is built/designed/configured for a mobile device. In some instances, the mobile library 403 may be specific to a mobile platform (e.g., iOS, Android, etc.). When the mobile application 401 is executed by an end user (e.g., by a customer of the organization providing the mobile application 401), the mobile library 403 may create an instance of a mobile browser 404. The mobile browser 404 may provide similar functionality as an instance of a web browser built/designed/configured for a mobile device (e.g., Safari on iOS). The mobile browser 404 may be instantiated within the mobile application 401 or separate from the mobile application 401. In some examples, the mobile library 403 may include additional components (e.g., static libraries, packages, frameworks, and the like) to enable the creation of the mobile browser 404.

An instance of the mobile browser 404 may enable the mobile application 401 to execute instructions in a non-native language. For instance, the mobile browser 404 may enable the mobile application 401 to load a web page dynamically, where the web page may include a set of instructions in a non-native language (e.g., HTML, JAVASCRIPT, etc.). To load a web page, the mobile application 401 may first request the contents of the web page from the TDN, and load the contents into the mobile browser 404. For example, where the mobile application 401 is a mobile iOS application comprising a set of instructions in Objective-C, the mobile browser 404 may enable the mobile application 401 to execute JAVASCRIPT instructions. Similarly, where the mobile application 401 is a mobile Android application comprising a set of instructions in JAVA programming language, the mobile browser 404 may enable the mobile application 401 to execute JAVASCRIPT instructions. Thus, the mobile browser 404 may effectively inject non-native code into a mobile application 401. The mobile browser 404 may conform to and enforce all security policies established by the mobile platform. Further, communication between the mobile application 401 and the mobile browser 404 may be encrypted using various encryption techniques, such that proprietary mobile application code is appropriately protected. Additionally, the mobile browser 404 may include a set of instructions to only permit the mobile application 401 to execute instructions within the mobile browser 404, such that other applications are not permitted to inject malicious instructions into the mobile browser 404. In some embodiments, the mobile browser 404 may be hidden from the end user (the hidden mobile browser 404 may also be referred to as a hidden browser or hidden webview). That is, the mobile browser 404 may be run in the background of the mobile application 401 or of the mobile device running the mobile application 401 without a user interface for the mobile browser 404 being displayed. In some examples, when an instance of the mobile browser 404 is created, the instance might not be added to the view stack of the device 101 executing the mobile application 401 so that the instance of the mobile browser 404 is prevented from being displayed to the end user. In some examples, the mobile browser 404 may include a set of instructions of a standard web browser (e.g., Safari, Google Chrome, Internet Explorer, etc.), and may be supported by the operation system (e.g., iOS, Android, etc.) of the mobile device.

Prior to the end user executing the mobile application 401, the mobile application 401 may be executed to complete incorporation of the mobile library and its associated analytics solutions. When the mobile application 401 is executed to configure the mobile application 401 to incorporate the mobile library 403, the mobile library 403 may capture screenshots 405. The screenshots 405 may be sent to an application programming interface (API) server 407.

The application programming interface server 407 may be associated with a particular web address or domain name so the mobile application 401 may locate it. For example, in some embodiments, the application programming interface server 407 may be associated with a domain name of "api.ensighten.com." The mobile application 401 may connect to the application programming interface server 407 through a network (not shown). The network may include a wide area network (WAN), such as the Internet, as well as other networks, such as a wired and/or wireless local area network (LAN) or cellular network. The mobile application 401 may communicate with the application programming interface server 407 using various protocols, such as the Transfer Control Protocol over Internet Protocol (TCP/IP).

The application programming interface server 407 may include memory (e.g., a database) for storing the screenshots 405. The application programming interface server 407 may also include a mobile application programming interface (API) 409. The application programming interface server 407 may host the mobile API 409, which may include computer-executable instructions for allowing a customer (e.g., an organization) and/or personnel of the entity managing the logical architecture 400 to create code files for responding to events occurring in the mobile application 401 and data captured from the mobile application 401. Further, the application programming interface server 407 may include a testing/content swapping API 411. As shown in FIG. 4, the testing/content swapping API 411 may be a layer on top of the mobile API 409. The testing/content swapping API 411 may include the computer-executable instructions for allowing a user to set up and manage multivariate tests and/or perform content swapping. For example, the testing/content swapping API 411 may include computer-executable instructions for translating information, which is entered into templates, into code modules/files.

The logical architecture 400 further includes a user interface 413 for interfacing with the mobile API 409. The user interface 413 may be a web-based interface. For example, the user interface 413 may be provided as a website or webpage. In such a case, the user interface 413 may be accessed by using a web browser and navigating to a particular website or webpage hosting the user interface 413. The logical architecture 400 may also include a testing/content swapping user interface 415. The testing/content swapping user interface 415 may be implemented as another layer on top of the user interface 413 or as a component or module of the user interface 413. Like the user interface 413, the testing/content swapping user interface 415 may be web-based, and therefore, provided through a website or webpage. Also, in some instances, a username, password, and/or other authorization information (e.g., encryption codes) may be needed to access either or both of the user interface 413 or the testing/content swapping user interface 415. The testing/content swapping user interface 415 may include particular pages or screens for allowing customers (e.g., organizations) and/or programmers of the entity managing the logical architecture 400 to create code files for performing multivariate testing with respect to the mobile application 401 and/or swapping content within the mobile application 401. In some embodiments, the user interfaces 413 and/or 415 may include templates for prompting users with certain questions to elicit certain information and collecting said information. For example, one template may collect information for an A version of an A/B test, while another template may collect information for a B version of the A/B test.

Code files created using the user interface 413 and/or testing/content swapping user interface 415 may be transmitted to (and published at) the tag delivery network (TDN) server 417. The TDN server 417 may be associated with a particular web address or domain name so the mobile application programming interface server 407 may locate it. For example, in some embodiments, the TDN server 417 may be associated with a domain name of "nexus.ensighten.com." In some examples, the TDN server 417 may be a part of a cluster region 301 (e.g., an Ensighten Nexus Clustering Region), and the mobile application programming interface may be separate from the cluster region 301. The mobile application programming interface server 407 may communicate with the TDN server 417 through a network (not shown), which may include a LAN, WAN (e.g., the Internet), and/or any other network. In some embodiments, the mobile application programming interface server 407 may communicate with the TDN server 417 using the TCP/IP protocol. Further, communications between the mobile application programming server 407 and the TDN server 417 may be encrypted using various encryption techniques. In some embodiments, the data sent from the mobile application programming interface server 407 may be encapsulated and sent via a tunnel to the TDN server 417.

As shown in FIG. 4, the TDN server 417 may include one or more cg.php files 419. The cg.php files 419 may include a set of instructions to allow the TDN server 417 to interact with the mobile application 401 or the mobile browser 404. For example, the cg.php file 419 may enable delivery of application-specific data (e.g., platform, version, etc.). In another example, the cg.php file 419 may enable delivery of additional files (e.g. JAVASCRIPT files). In some examples, there may be a separate cg.php file 419 for each platform (e.g., iOS, Android, Windows Phone 8), and/or for each customer (e.g., a mobile application provider). In other examples, there may be one common cg.php file 419, where the common cg.php file 419 may contain logic for all platforms and all customers.

Further, the TDN server 417 may include memory 421 storing mobile TDN files. The mobile TDN files may include a tag container 423, mobile bootstrap file 425, and mobile code files 427. Upon request, the tag container may be provided to a mobile device running the mobile application 401. The tag container 423 may include code for instructing a browser on a mobile device running the mobile application 401 to load certain files, such as the mobile bootstrap file 425. The tag container 423 may coordinate (or control) the execution of files to allow tags to be executed in conjunction with the mobile application 401. In some embodiments, the tag container may be implemented as a hypertext markup language (HTML) document thereby allowing it to be interpreted by a web browser. As shown in FIG. 4, the tag container 423 may be loaded by a mobile browser 404. In some embodiments, the mobile browser 404 may be hidden from the user so the user may not be aware of the loading of the tag container 423.

As mentioned, the tag container may load the mobile bootstrap file 425. The mobile bootstrap file 425 may enable communication between the mobile application 401 and the TDN server 417. In some examples, where the mobile application 401 includes a set of instructions in a native language, the mobile bootstrap file 425 may enable the native code (e.g., Objective-C code) of the mobile application 401 to utilize code in a non-native language (e.g., JAVASCRIPT) provided by the TDN server 417. Accordingly, the mobile bootstrap file 425 may advantageously reduce code duplication by maintaining one common set of instructions in a non-native language (e.g., JAVASCRIPT) which can be utilized by mobile applications written in various native languages (e.g., Objective-C, JAVA, C#). The mobile bootstrap file 425 may be a generic file that all tags for any mobile application may be passed to. When executed, the mobile bootstrap file 425 may retrieve specific tags for the particular mobile application 401 being executed. In some embodiments, the mobile bootstrap file 425 may be implemented as a JAVASCRIPT file. Also, in some embodiments, the mobile bootstrap file 425 may include code specific to retrieving tags for mobile applications and may be executed in conjunction with (e.g., as a supplement to) a generic bootstrap file that also retrieves tags for webpages.

The mobile code files 427 may be specific to certain mobile applications. For example, a first mobile code file 427 may include code for an analytics solution (e.g., multivariate testing) for a first mobile application, while a second mobile code file 427 may include code for an analytics solution for a second mobile application. Here, the first and second mobile applications may be different versions of the same mobile application or mobile applications for different purposes. Also, the first and second mobile applications may be provided by the same or different organizations. For example, an organization may have two different mobile applications designed to serve two different purposes, and thus, there may be one mobile code file 427 for one of the two mobile applications and another mobile code file 427 for the other of the two mobile applications. In some embodiments, multiple mobile code files 427 may pertain to a single mobile application 401.

The mobile code files 427 may be generated by the application programming server 407 and/or the TDN server 417 in response to information provided through the user interface 413 or testing/content swapping user interface 415. The mobile code files 427 may include one or more opcodes which may be used to define a response to an event occurring within a mobile application 401. An opcode may include a mapping between an application event and one or more function handlers. The application event may correspond to a triggering event for the opcode, such that the associated function handlers are invoked upon detection of the application event. The application event may be an execution of a native method on a particular mobile platform (e.g., a page is viewed/loaded, an element is rendered on the page, an element is clicked or otherwise interacted with, a meta tag is fired, etc.). The function handler may be used to define a call to one or more functions (e.g., a JAVASCRIPT function) and values to be passed as parameters to the functions. Accordingly, the function handler may cause one or more functions to be executed when an associated application event is detected. The function handler may be used to invoke functions or properties defined in the mobile application in native code. Thus, an opcode may be implemented in a non-native language (e.g., JAVASCRIPT), such that an opcode may be shared across one or more mobile and non-mobile platforms. In some examples, one or more opcodes may be invoked upon the occurrence of a particular application event, and each opcode may invoke its associated function. The opcodes in any given mobile code file 427 may be changed by users at any time. For example, users may provide new values to be used in opcodes. Also, opcodes may be deleted entirely and other opcodes may be added to a mobile code file 427. Also, in some embodiments, an opcode may be used for multiple application events. Vice versa, a single application event may cause multiple function handlers to be invoked.

In some examples, an opcode may comprise a key-value pair, where the key is an application event, and the value is one or more function handlers mapped to the key. For example, an opcode may be defined as:

{applicationEvent1, {callFunction1, callFunction2}} where "applicationEvent1" is the application event (e.g., a home page of the mobile application is viewed), and where "callFunction1" and "callFunction2" are names of function handlers. The function handlers may cause the mobile application 401 or mobile browser 404 to execute one or more functions to, for example, fire tags, change one or more properties of one or more objects in the mobile application 401 so as to implement a multivariate test (e.g., an A/B test), add and/or replace page content, etc. It will be appreciated that the mapping between application events and function handlers may alternatively be defined using other data structures or constructs (e.g. predefined data structures, custom-defined classes, etc.). In some examples, an opcode and its associated value may be stored in a register, such that an opcode may be referenced using register token syntax (e.g., "r:callFunction1").

In some examples, a function handler may comprise a key-value pair, where the key is a name of the function handler, and the value is a call to a function (e.g., a JAVASCRIPT function) and its method signature (e.g., expected input and/or output parameters), wherein the value is mapped to the key. For example, a function handler may be defined as:

{callFunction1, {addPageElement([params]), trackPageView([params])}} where "callFunction1" is the name of the function handler, and where "addPageElement[params]" and "trackPageView([params])" are functions. It will be appreciated that a functional handler may alternatively be defined using other data structures or constructs (e.g. predefined data structures, custom-defined classes, etc.). The function may be defined locally (i.e. within the same file or class as the function handler), in an external file or class, or in the mobile application. In some examples, where the function is defined in external files or classes, the external files or classes may advantageously group similar functions by category, such as functions specific to a customer, an organization, or a technology (e.g., an analytics platform).

The TDN server 417 may also include memory 429 storing TDN management files. The TDN management files may include a bootstrap file 431, a server management file 433, and rule files 435. The bootstrap file 431 may be a generic bootstrap file that can be used to retrieve tags for webpages as well as mobile applications. The bootstrap file 431 may be configured so that it can be loaded into the document object model (DOM) of a webpage by a web browser for collecting analytics from a webpage or loaded into a hidden browser on a mobile device for collecting analytics from a mobile application. In the latter case, the bootstrap file 431 may be loaded by the tag container 423 once the tag container has been loaded into the hidden browser. The bootstrap file 431 may provide a foundation (e.g., basic functions and libraries) from which the mobile bootstrap file 425 may build on. The two layer architecture including the mobile bootstrap file 425 and bootstrap file 431 may allow analytic solutions (e.g., a multivariate test) to be applied across multiple platforms (e.g., the web and mobile applications).

Although memory 429 is illustrated as being separate from memory 421, it should be understood that they may be a single storage device or each broken down into one or more storage devices. Also, any file described as being stored in one memory may be stored in the other.

The server management file 433 may include code for managing the TDN server 417. In some embodiments, code in the server management file 433 may be written using PHP, which is a commonly used server-side scripting language. The server management file 433 may execute logic for one or more web applications, such as web applications for loading tags to webpages and collecting analytics from webpages. In some embodiments, the server management file 433 may include a page lookup file 437. The page lookup file 437 may be written using, for example, a markup language, such as the Extensible Markup Language (XML). The page lookup file 437 may provide a mapping between a view in the mobile application 401 and one or more rule files 435. The page lookup file 437 may be called by the mobile browser 404. The mobile browser 404 may provide information to the page lookup file 437 indicating the code/script it wants to execute based on the view in the mobile application 401 and the page lookup file 437 may return one or more rule files 435.

The rule files 435 may include code for implementing various rules. A rule file may comprise one or more rules. A rule may include a mapping between a condition and an opcode, such that the rule prevents an opcode from being triggered/executed by the mobile browser 404 and/or mobile library 403 unless the condition is satisfied, or only loads an opcode into the mobile browser 404 and/or mobile library 403 upon satisfaction of the condition. For example, a condition may include a geographic location of the mobile device, mobile platform utilized by the mobile device, or user profile information (e.g., biographical data, user preferences, etc.). For example, a rule may be created such that a particular opcode may be triggered for users using mobile devices in a particular city (e.g., Chicago) or a particular country. This example rule may block the opcode from being triggered for users using mobile devices outside of Chicago or outside a particular country. Some jurisdictions may have regulations/laws prohibiting collection of certain data or implementation of certain testing, so such rules may be beneficial in complying with such regulations/laws. It will be appreciated that a condition may comprise multiple factors (e.g., a user in Chicago using an Android mobile device under the age of 30). In other examples, a rule may be used to define multivariate tests. For example, a rule may be used to define a mapping such that a first opcode (e.g., "opcode1") is triggered for 5% of users, a second opcode (e.g., "opcode2") is triggered for 10% of users, and no opcodes are triggered for the remaining 85% of users. Rule files 435 may be specific to a mobile application or used across multiple mobile applications. Also, in addition to using the rule files 435 to map conditions to opcodes for mobile applications, one or more of the rule files may also be used to map conditions to opcodes when a user visits a webpage. Thus, rule files 435 may be used in multiple platforms, so analytic solutions (e.g., multivariate testing) may be applied across multiple platforms. Thus, in some embodiments, a rule file 435 may be specific to a particular webpage or view of a mobile application 401.

The rule files 435 may be created using a manage user interface 439. The manage user interface 439 may be hosted on a separate server from the TDN server 417 and/or servers of the cluster regions 301. The manage user interface 439 may allow users (e.g., customers, such as organizations, or personnel of the entity controlling the logical architecture 400) to create custom rules. The manage user interface 439 may be a web-based interface. For example, the manage user interface 439 may be provided as a website or webpage. In such a case, the manage user interface 439 may be accessed by using a web browser and navigating to a particular website or webpage hosting the manage user interface 439. Also, in some instances, a username, password, and/or other authorization information (e.g., encryption codes) may be needed to access the manager user interface 439. The manage user interface 439 may include intake templates for gathering information so that rules may be automatically generated. Additionally, or alternatively, the manage user interface 439 may provide one or more fields in which a user may enter (e.g., write and/or paste) code to be used to generate a rule. Also, the manage user interface 439 may provide one or more objects (e.g., drop down menus, radio buttons, etc.) that a user may use to select previously prepared rules. In some embodiments, the rule files 435 may be JAVASCRIPT files or classes, and may contain one or more rules. In some embodiments, the manage user interface 439 may be combined with the mobile user interface 413 and testing/content swapping user interface 415 so that they are available to a user at one site or simultaneously. In some embodiments, information entered into the user interfaces 413, 415, and/or 439 may be used to generate the mobile code files 427 and rule files 435 simultaneously or in parallel. In some embodiments, the mobile code files 427 may be combined with the rule files 435. In such embodiments, one comprehensive data structure or construct may be used to define mappings between rules, application events, function handlers, and function definitions. For example, a rule may be defined as:

{applicationEvent1, {addPageElement([params]), track-PageView([params])}}

It will be appreciated that a rule may alternatively be defined using other data structures or constructs (e.g. predefined data structures, custom-defined classes, etc.).

Figure 5:
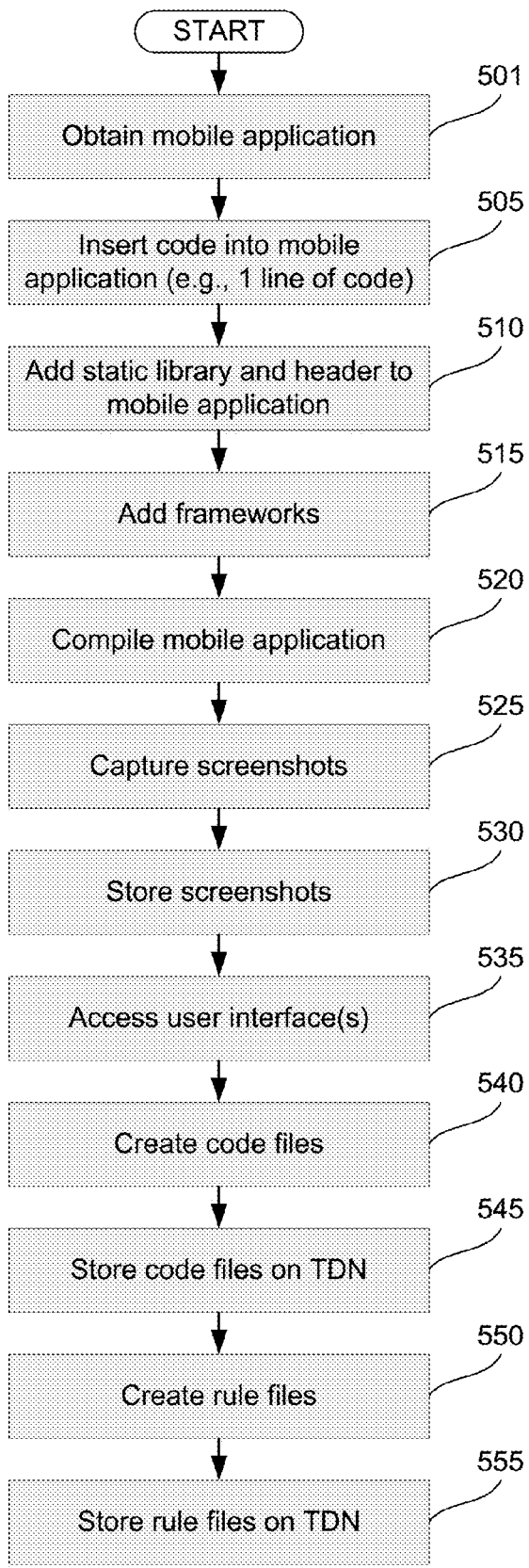
FIG. 5 is a flow diagram illustrating an example method in accordance with various aspects of the present disclosure.

FIG. 5 illustrates a flow diagram for an example configuration process in accordance with aspects of the present disclosure. More specifically, FIG. 5 illustrates a plurality of steps of a method of configuring a mobile application for collecting analytics and performing multivariate testing and/or content swapping. The steps of FIG. 5 may be performed by any of the devices described herein, such as servers of the TDN and computing devices 101 executing the mobile application 401 or any of the user interfaces disclosed herein.

The method of FIG. 5 may begin with a step 501 of obtaining the mobile application 401 to which analytics solutions are desired to be applied. For example, an organization (e.g., a customer of an entity providing the TDN) that has developed a mobile application 401 may obtain a file or package (e.g., .ipa for a mobile iOS application, .apk for a mobile Android application, etc.) containing the source code for the mobile application 401. As mentioned herein, aspects of the disclosure may allow organizations (e.g., companies) that develop mobile applications to configure their mobile applications themselves to include code (developed by others, such as an entity that offers the TDN) that allows them to collect analytics related to their mobile applications.

Next, code may be inserted into the obtained mobile application 401 at step 505. For example, a single line of Objective-C code may be inserted into the mobile application 401. In some examples, the single line of code may be the following:

[Ensighten bootstrapForClient: @"CLIENT_ID" and App: @"APP_ID"].

This line of code may be inserted into a principal file of the mobile application 401, where the principal file is responsible for starting the application. For example, the principal file for a mobile iOS application is a "main.m" file. The inserted code may reference the mobile library 403 (e.g., a static library) and/or a header file.

In step 510, the mobile library 403 and/or one or more header files may be added (e.g., imported) into the mobile application 401. The mobile library 403 and/or header files may be supplied by the entity controlling the TDN (e.g., Ensighten) to the organization (e.g., a customer of Ensighten) that developed the mobile application 401. For example, a static library—"Ensighten.a"—and a header file—"Ensighten.h"—may be provided to an organization or other entity interested in adding analytics solutions to their mobile applications 401.

In a case where the mobile application 401 is an iOS application, the mobile library 403 and headers may be added by performing the following at step 510:

1. Launch Xcode
2. In the Groups & Files panel, right-click on the project that the library is to be added to and then click Add→Existing Files.
3. Browse to find the header file (e.g., "Ensighten.h"), and then click Add.
4. Select Copy items into destination group's folder (if needed).
5. Set Reference Type to Default.
6. Set Text Encoding to Unicode (UTF-8).
7. Select Recursively create groups for any added folders.
8. In the Add To Targets section, confirm that the project is selected and click Add.
9. Open the Targets group (in the Groups & Files panel), right-click the project icon, then select Add→Existing Frameworks.
10. In the Linked Libraries section, click the Add Libraries icon (+), then click Add Other.
11. Select the static library supplied (e.g., "Ensighten.a"), then click Add.
12. Repeat 4-9 for the static library.

In step 515, frameworks and/or other libraries may be added, if they have not already been included in the mobile application 401. For example, in a case where the mobile application 401 is an iOS application, the following frameworks may be added: CFNetwork.framework; CoreTelephony.framework; MediaPlayer.framework; CoreMedia.framework; libz.dylib; SystemConfiguration.framework; and MobielCoreServices.framework.

After adding the mobile library 403, a header file, and any necessary frameworks, the mobile application 401 may be compiled at step 520. That is, at step 520, the added code, libraries, files, and frameworks may be compiled into the mobile application 401. After compiling, the mobile application 401 may be in its completed form. That is, no further changes to the mobile application 401 may be required. As such, the mobile application 401 may be submitted to a platform operator (e.g., APPLE's App Store or GOOGLE's Google Play) for approval.

In step 525, the mobile application 401 may be executed with the static library in a capture mode to capture screenshots 405 of the mobile application 401. In some examples, the screenshots 405 may be visual representations of the various pages, views, or interfaces defined by the mobile application 401. Additionally or alternatively, the screenshots 405 may contain references to the page markup (e.g., element identification, element names, tags, etc.). The screenshots 405 may enable the user interface 413 to render a webpage or view of the mobile application for the user such that the user may define rules for various application events. In some embodiments, the mobile application 401 may capture all possible screenshots 405 automatically. For example, the mobile application 401 may recursively crawl through all defined interfaces using either a depth-first or breadth-first approach. In some embodiments, the mobile application 401 may capture a "view hierarchy" or a "site map" by organizing captured screenshots 405 into a data structure that indicates the relationships among the various screenshots 405 (e.g., which screenshot appears when a button on another screenshot is selected). Alternatively, a user may control which screenshots 405 are captured. For instance, a user may interact with the mobile application 401 such that each view rendered for the user is captured. After capturing the screenshots 405, the screenshots 405 may be transmitted or outputted to the application programming interface server 407 through the mobile API 409.

In step 530, the application programming interface server 407 may receive the screenshots 405. Further, the application programming interface server 407 (e.g., the mobile API 409 thereof) may store the screenshots 405 in memory. The memory may be within the server 407 or in memory coupled to the server 407.

In step 535, a user (e.g., personnel of an organization that owns the mobile application or personnel of an entity that controls the TDN, such as Ensighten) may access the user interface 413 or testing/content swapping user interface 415. Such user interfaces 413 and/or 415 may be accessed using any computing device 101 by, for example, using a web browser to access a website providing the user interfaces 413 and/or 415. When a user accesses the user interfaces 413 and/or 415 at step 535, the user interfaces may establish a connection with the mobile API 409 of the application programming interface server 407. In some embodiments, this connection may be secure (e.g., encrypted). Through this connection, the user interface 413 and/or testing/content swapping user interface 415 may access the screenshots 405.

In step 540, the user (e.g., marketing personnel) may use the user interfaces 413 and/or 415 to create mobile code files 427 that may be used by the static library to respond to events that may occur in the mobile application 401 and/or to respond to data captured from the mobile application 401. The user may use the screenshots 405, received from the Mobile API 409 and provided through the user interfaces 413 and/or 415, to create the mobile code files 427. For example, the user may select a particular screenshot 405 (or an element of a screenshot 405), and an event type (i.e. the expected interaction with the screenshot 405 or element of the screenshot 405). The combination of the screenshot 405 (or an element of a screenshot 405) and the event type may define an application event. The user may further define one or more functions to be executed upon the occurrence of the application event. In some examples, the user may define the functions by specifying one or more function handlers to be used. The use of function handlers to define the functions may advantageously increase code reuse and reduce duplication, since a customer or organization may want to define the same or similar functions for different application events. The user's association of an application event with one or more function handlers or functions may be used to create an opcode. In some embodiments, one or more opcodes may be included in one of the mobile code files 427.

In some instances, in step 540, the user may use the user interface 415 to create mobile code files 427 for implementing a multivariate test (e.g., A/B test) for the mobile application or swapping content in the mobile application 401. The screenshots 405 may be used to identify which objects are to be changed for different versions of a multivariate test or to carry out content swapping. A user may indicate an object of the mobile application 401 to be changed and how it is to be changed. The user may also indicate specific actions to reposition page elements, hide or reveal page elements, change the styling of page elements (e.g., color, size, font, etc.), and add page elements (e.g., advertisements, images, text, etc.). The information may then be used to create a mobile code file 427 for implementing the change. Code files 427 and/or opcodes may be created by selecting function handlers (e.g., from a library of available function handlers) based on the user-provided information (e.g., specific actions defined by the user).

In step 545, the created mobile code files 427 may be transmitted to the TDN server 417. For example, when the user submits (or saves) the mobile code files 427, the mobile API 409 may publish the mobile code files 427 to the TDN server 417. The TDN server 417 may store the mobile code files 427 in memory of the TDN server 417 or memory coupled thereto. In some embodiments, when mobile code files 427 are stored on one TDN server 417, they may be distributed and stored on all TDN servers 417 in the TDN (see FIG. 3). As a result of step 545, the mobile code files 427 may be available for detecting and handling certain events and data from the mobile application when the mobile application 401 is used going forward.

In step 550, a user (e.g., personnel of an organization that owns the mobile application or personnel of an entity that controls the TDN, such as Ensighten) may access the manage user interface 439. The manage user interface 439 may be accessed using any computing device 101 by, for example, using a web browser to access a website providing the manage user interface 439. When a user accesses the manage user interface 439 at step 535, the manage user interface 439 may establish a connection with the TDN server 417. In some embodiments, this connection may be secure (e.g., encrypted). Through this connection, the manage user interface 439 may access files, such as previous rule files, stored on the TDN server 417. Further, the user may use the manage user interface 439 to create new rule files or edit previous rule files. The manage user interface 439 may also provide access to the opcodes, application events, and function handlers defined by the user through the user interface 413 or 415. In some embodiments, the user of the manage user interface 439 may create new rules by mapping conditions to opcodes. For example, the user may specify a certain percentage of end users to whom an A/B test is to be deployed, and this percentage may be used to create a rule to regulate the deployment accordingly. New rules may be included in one or more rule files.

In step 555, the new or updated rule files may be stored on the TDN server 417. For example, when the user submits (or saves) the rule files in the manage user interface 439, the submitted rule files may be published to the TDN server 417. The TDN server 417 may store the rule files in memory of the TDN server 417 or memory coupled thereto. In some embodiments, when rule files are stored on one TDN server 417, they may be distributed and stored on all TDN servers 417 in the TDN (see FIG. 3). As a result of step 555, the rule files may go into effect to regulate the use of certain mobile code files 427 (and their opcodes) based on various conditions (e.g., test segments, geographical locations, end-user information) in the mobile application 401 when it is used going forward.

Figure 6:
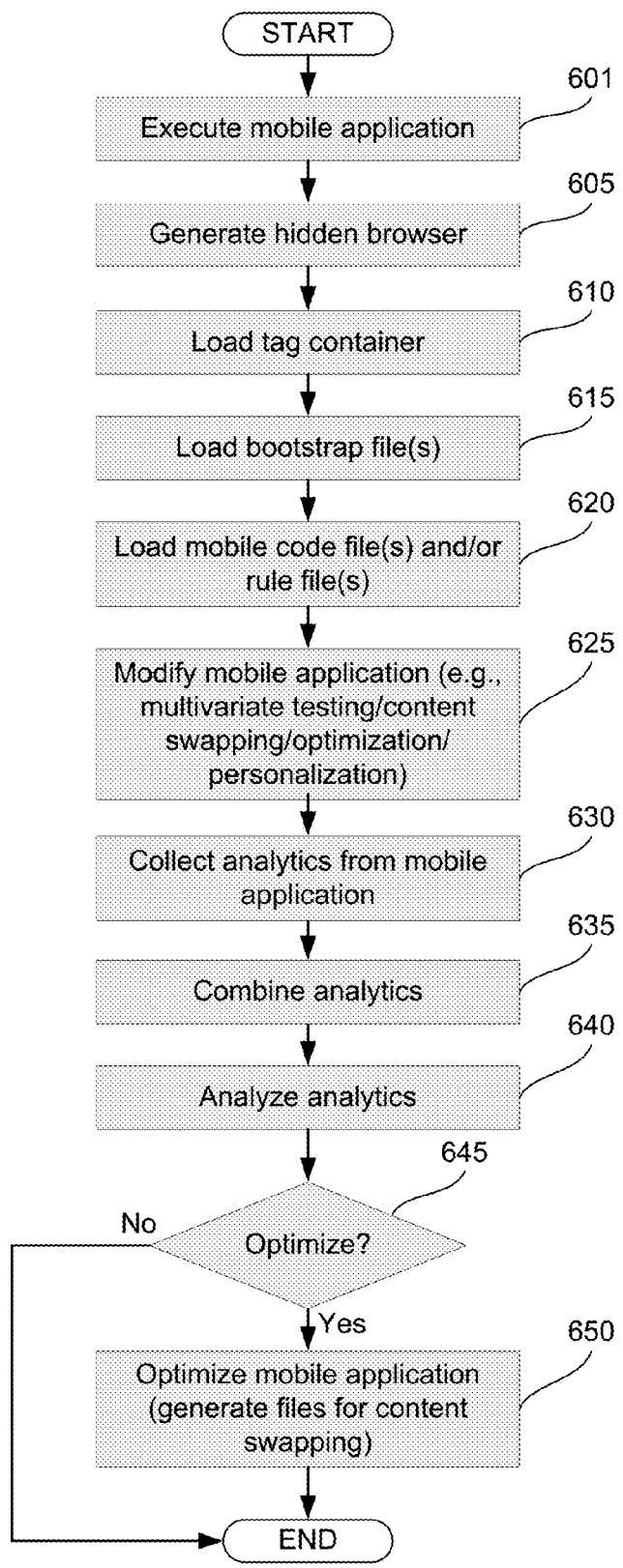
FIG. 6 is a flow diagram illustrating an example method in accordance with various aspects of the present disclosure.

FIG. 6 illustrates a flow diagram for an example tag delivery process in accordance with aspects of the present disclosure. More specifically, FIG. 6 illustrates a plurality of steps of a method of delivering tags for collecting analytics and performing multivariate testing and/or content swapping. The steps of FIG. 6 may be performed by any of the devices described herein, such as servers of the TDN and computing devices 101 executing the mobile application 401 or any of the user interfaces disclosed herein.

The method of FIG. 6 may begin with a step 601 in which a user (e.g., a person who downloaded the mobile application 401 from an online store, such as the App Store or Google Play) selects to launch the mobile application. Accordingly, step 601 may include a mobile device running (or executing) the mobile application 401.

In step 605, the mobile library 403 may generate an instance of a hidden browser 404. The hidden browser 404 may be similar to (or a component of) a typical web browser (e.g., APPLE's Safari, MICROSOFT's Internet Explorer, etc.), except that it does not have a user interface that is displayed on a screen of the mobile device running the mobile application 401. Instead, the hidden browser may be run in the background by the operating system of the mobile device. In some embodiments, if multiple mobile applications are running at the same time on the same mobile device and each mobile application has the mobile library 403, then each mobile library 403 may create a separate hidden browser 404. In such embodiments, the hidden browser 404 may execute within each mobile application, or may execute separately from each mobile application. In other embodiments, if multiple mobile applications are running at the same time on the same mobile device and each mobile application has the mobile library 403, then mobile libraries 403 may share a single hidden browser 404.

In step 610, the hidden browser 404 may load the tag container 423. In some embodiments, the hidden browser 404 may load a single tag container 423. Alternatively, the hidden browser 404 may load multiple tag containers 423. Regardless of the particular mobile application 401 running on the mobile device, the same tag container 423 may be loaded into the hidden browser 404. In other words, the tag container 423 that is loaded into the hidden browser 404 may be a generic tag container 423 that can be used by all types of mobile applications 401 (e.g., retail, social networking, travel, games, word processing, photo-editing, media players, etc.).

In step 615, the tag container 423 may instruct the hidden browser 404 to load a bootstrap file 431 and/or a mobile bootstrap file 425. Per the tag container instructions, the hidden browser 404 may request and receive the bootstrap file 431 and/or mobile bootstrap file 425 from the TDN server 417. In some embodiments, the tag container 423 may instruct the hidden browser 404 to load the bootstrap file 431 before the mobile bootstrap file 425. Requests for, and transmission of, the bootstrap file 431 and mobile bootstrap file 425 may be carried out using TCP/IP or any other protocol. The bootstrap file 431 and mobile bootstrap file 425 may be JAVASCRIPT functions that are executed by the hidden browser 404 upon being loaded into the browser 404.

In step 620, the TDN server 417 provides mobile code files 427 and rule files 435 to the hidden browser 404. The mobile code files 427 and rule files 435 may be specific to the particular mobile application 401 being executed. The rule files 435 may determine whether to load or inject the mobile code files 427 into the native code of the mobile application 401. This determination may be based on the rules of the rule files 435 and information provided to the mobile browser 404 from the mobile library 403. The rule files 435 may be JAVASCRIPT functions that are executed by the mobile browser 404 to collect information from and pass commands to the mobile library 403. For example, a rule file 435 may be a JAVASCRIPT function that collects the version number of the mobile application 401, determines whether a mobile code file 427 is to be injected into the native code for that version, and passes the mobile code file 427 to the mobile library 403 depending on the determination. As another example, a rule file 435 may collect the geographical location or IP address of the device executing the mobile application 401, determine whether a mobile code file 427 is to be injected based on the geographical location or IP address, and pass the mobile code file 427 according to a result of the determination. The mobile code files 427 may include event/function handlers for injection into the native code so that the appropriate event/function handlers may be executed when event/function listeners of the mobile library 403 detect certain events. In some embodiments, instead of passing mobile code files 427 to the mobile library 403, the hidden browser 404 may execute one or more of the mobile code files 427. For example, the mobile library 403 may pass data to the hidden browser 404, which may execute a mobile code file 427 that determines whether any of the data indicates an event for which a response/action (e.g., reporting analytics) is to be performed.

In some embodiments, a rule file 435 may control whether mobile code files 427 are retrieved from the TDN server 417. The rule file 435 may prevent mobile code files 427 from being downloaded to the mobile browser 404. For example, a rule file 435 may determine that a user of the mobile application 401 is not part of the population for which an A/B test is to be applied, and therefore, may prevent the downloading of the mobile code files 427 so that the mobile application 401 appears as it was originally configured to appear.

In step 625, the hidden browser 404 may modify the mobile application 401. The hidden browser 404 may determine whether multivariate testing and/or content swapping is to be performed for the mobile application 401. This determination may be based on the mobile code files 427 and/or rule files 435 loaded into the tag container 423. For example, if a rule file 435 indicates that a user of the mobile application 401 is part of a target population for an A/B test, the rule file 435 may execute a script to inject a mobile code file 427 into the native code of the mobile application 401 to carry out the A/B test. For example, the rule file 435 may determine that the user should see version A of the mobile application, and therefore, may send a mobile code file 427 to the mobile library 403 so that version A of the mobile application 401 is provided to the user.

If multivariate testing or content swapping is to be performed, the hidden browser 404 may pass parameters or mobile code files 427 to the mobile application 401 (including its mobile library 403) to modify the mobile application 401. The mobile library 403 may detect various events and use a parameter or execute a mobile code file 427 to determine whether an event triggers a certain action. If so, the mobile library 403 may execute the mobile code file 427 or use the parameter to change one or more values of the native code or call a function (e.g., a JAVASCRIPT function) to be executed by the hidden browser 404.

In runtime, the mobile library 403 may attach functions to various elements, objects, and methods of the mobile application 401. The dynamically attached functions may subsequently allow mobile code files 427 to be loaded (or injected) into the native code of the mobile application 401. In some embodiments, the functions may be attached based on opcodes and/or other constructs defined in the mobile code files 427. The attaching of functions may include embedding opcodes (and corresponding function listeners and handlers) and/or other constructs into the native code of the mobile application 401 thereby modifying the functionality and/or appearance of the mobile application 401. Although the functionality and/or appearance of the mobile application 401 may be modified, the compiled code may remain the same (e.g., unchanged).

In some embodiments, the attachment of the functions may be performed using technologies, such as swizzling, AspectJ weaving, and POST SHARP ASPECT weaving. Such technologies may cause the mobile application 401 to execute alternate functions in run-time. For example, upon the occurrence of a particular event, a function defined in an opcode or other construct may execute in place of a function defined in the compiled code (e.g., source code) of the mobile application 401. An example construct within a mobile code file 427 for changing the appearance of the mobile application 401 may include a custom class definition having various attributes as shown below:

<CLASS object>—UNIQUE class name
<EVENT object>—UNIQUE event name, object
<ELEMENT object>—UNIQUE PATH to the element in the context of EVENT
  "comment"//pretty name of the element
  "path"//dictionary where we can specify the type of lookup and value
  type: propName value: signInButton or
  type: eid:value: 1234567890
<ACTION array>//executed in order for the event
<ACTION object>//custom to the platform and action
  "index"//0-based index of action queue
  "enabled"//boolean controlling execution
  "name"//name of the action: "inflate", "modify", "replace", "hide", "append"
  "viewClass"//view class type for replace and append actions,
  i.e., android.widget.TextView
  "description"//name identifying change—"increase size of purchase button"
  "data"//action specific data
"qualifiers"//optional array of qualifier objects that must ALL match
"testID": "testID"
"variationID": "variationID",
"attributionID": "attributionID"

One or more of the attributes of the class shown above may be optional. The opcode(s) and other construct(s) of the mobile code files 427 may include a function listener that listens for the execution of the application event and a function handler for acting on the event to modify the functionality and/or appearance of the mobile application 401.

Still referring to step 625, the hidden browser 404 may pass a parameter or mobile code file 427 (including an opcode or other construct) to change the background color of the mobile application 401 at step 625. The mobile library 403 may detect a page load event for the page that is to have its background color changed. Upon detection, the mobile library 403 may use the parameter or execute the mobile code file 427 (including one or more opcodes and/or other constructs) to change a value for the color of the background in the native code of the mobile application. As such, some users of the mobile application 401 may see one version of the mobile application 401, while other users may see another version of the mobile application 401. As another example, the hidden browser 404 may pass a parameter or mobile code file 427 (including an opcode or other construct) to change the advertising content of the mobile application 401 in some instances. Thus, some users of the mobile application 401 may see a first advertisement within the mobile application 401, while other users of the mobile application 401 may see a second advertisement within the mobile application 401.

In some embodiments, a decision algorithm may be used to determine which experience to deliver to the user. The decision algorithm may select a user experience based on a random selection (e.g., 'roll of the dice' approach), or a fixed distribution (e.g., 60/40, uniform distribution, etc.). The decision algorithm may also consider other factors, such as geographic location of the mobile device, mobile platform, or user profile information (e.g., biographical data, user preferences, etc.). In some examples, the decision algorithm may be included within a rule of a rule file 435, such that a condition of a rule incorporates the decision algorithm. Alternatively, the decision algorithm may be implemented separately from the rule files 435.

Moreover, modifications to the mobile application 401 may be based on conditional logic defined in a rule and/or a decision algorithm. For example, conditions may include a device type of the mobile device running the mobile application 401, a geographical location of the mobile device running the mobile application 401, an amount of usage of the mobile application 401, a time or date of accessing the mobile application 401, a battery life of the mobile device running the mobile application 401, a percentage of video viewed within the mobile application 401, etc. For example, a mobile application 401 may vary the content served based on the mobile device's screen resolution (e.g., retina images). In another example, the mobile application 401 may implement a certain ad strategy based on the time of day that the mobile application 401 is accessed. This feature may also allow mobile application 401 providers to comply with different mobile privacy standards or laws in different jurisdictions. For example, based on the geographical location of the mobile device running the mobile application 401, the hidden browser 404 may or may not fire certain tags so as to avoid collection of analytics that are not permitted in certain jurisdictions. If a jurisdiction requires that permission be requested before obtaining certain analytics, the mobile application 401 may be modified to provide a dialog box to request permission and allow or suppress firing of tags based on the end user's response to the request for permission.

Further, in some embodiments, the modifications to the mobile application 401 at step 625 may be to optimize the mobile application 401 based on a previous analysis of analytics. For example, if it is determined that the appearance (e.g., size, shape, color, etc.) of an element of the mobile application 401 should be changed based on analysis of previously collected analytics, a JAVASCRIPT function may be executed by the hidden browser 404 to carry out the change. Opcodes and/or rules may be modified to implement the change. Similarly, if it is determined that the appearance of an element of the mobile application 402 should be changed based on analytics collected during a multivariate test, the corresponding rule may be changed such that the "winning" variant is implemented (e.g., by removing the associated condition, by setting the condition to 'true', etc.). Further, a multivariate test may be reconfigured (e.g., turning off one variant, changing the distribution, etc.) by changing the corresponding opcode or other construct and/or rule.

Also, in some embodiments, the modifications to the mobile application at step 625 may be to personalize the mobile application 401. For example, a retailer may know the interests of a particular customer, and therefore, may want to personalize that customer's experience with their mobile application based on the known interests. For example, if a particular customer likes outdoor activities, the mobile application 401 may be personalized to include advertisements related to outdoor activities (e.g., ads for camping equipment).

Personalization may be implemented using user profiles. User profiles may be created using any of the interfaces 413, 415, or 439 disclosed herein. The user profiles may be set up by the end users themselves (e.g., a retail customer) or by the organization providing the mobile application 401 (e.g., a retailer). Where an organization establishes profiles for the end users (e.g., their customers), the organization may gather information for the profiles by surveying the end users and/or by analyzing other information about the end users, such as their past purchases. Once the profiles are created, they may be stored on a server in the TDN, such as the TDN server 417. In addition, the profiles may be used to generate mobile code files 427 and/or rule files 435. Such mobile code files 427 and rule files 435 may include JAVASCRIPT functions for performing personalization of the mobile application 401. For example, a mobile code file 427 may include a JAVASCRIPT function (or a reference to an appropriate opcode) for changing the content of the mobile application 401 to include content in accordance with the known interests or preferences of the identified end user. The mobile code file may be referenced in a rule file, such that it is triggered in response to an application event (e.g., loading of a particular page, clicking a particular object, etc.).

In addition to personalizing the mobile application 401 based on an end user's interests and preferences, the mobile application 401 may be personalized based on an end user's past interactions across multiple platforms. For example, if a specific end user visit's an organization's website and demonstrates an interest in a particular product/service (e.g., by clicking on a link to learn more about the product/service), the hidden browser 404 may cause the mobile application 401 provided by that organization to be modified to include an ad for the product/service when the specific end user launches the mobile application 401. As such, in accordance with aspects of this disclosure, analytics collected from one platform (e.g., a website) may be used to modify a user's experience with a mobile application 401.

In step 630, a user (e.g., a person who downloaded the mobile application 401 from an online store, such as the App Store or Google Play) may interact with the mobile application 401. As the user interacts with the mobile application, event/function listeners running within the mobile library 403 may detect events (e.g., mouse-clicks, mouse-overs, cursor movements, etc.) and execute instructions (e.g., mobile code files 427) accordingly. The instructions may capture data (e.g., page load times, image load times, IP addresses, elements displayed, elements interacted with, etc.) and send the data to the hidden mobile browser 404. Next, the mobile browser 404 may execute a script (e.g., a JAVASCRIPT) that transmits the data, e.g., via the Internet, to a backend server (e.g., TDN server 417) responsible for collecting analytics.

In some embodiments, event listeners executed in the mobile application 401 (e.g., by the mobile library 403) may trigger opcodes to make a call to one or more functions (e.g., JAVASCRIPT functions). When certain events are detected and/or certain data is captured, functions running within or available to the hidden browser 404 may cause tags to be fired. In some embodiments, these functions may be implemented as JAVASCRIPT functions. These JAVASCRIPT functions may create tags for collecting analytics related to the mobile application 401 and cause the tags to be transmitted to a backend system responsible for collecting analytics data. In some instances, the tags may be sent to a server of the TDN. Additionally, or alternatively, the tags may be sent to other third party vendors that collect analytics (e.g., Google Analytics, Webtrends, etc.).

In step 635, the analytics collected from the mobile application may be combined with analytics collected from a corresponding website or webpage. For example, a company that has a website and a mobile application may want to combine analytics collected from visits to their website with analytics collected from uses of their mobile application to gather a more complete and accurate view of how their customers interact with them across various devices (e.g., personal computers, mobile devices, etc.) and formats.

In step 640, the collected analytics (e.g., the analytics collected from the mobile application 401 alone or analytics collected from both the mobile application 401 and a website) may be analyzed. For example, software running on the TDN server 417, application programming server 407, or another server may evaluate the analytics to determine performance statistics, such as average page load times, average image load times, etc. If a multivariate test was implemented, step 640 may include determining which version of the mobile application 401 was the most successful. Here, success may be measured in a variety of ways. For example, a version may be deemed more successful if page load times or certain image load times are reduced, if more users progress to a next step from a certain version, if more sales and/or revenue are obtained from a certain version, or if an average time spent using the mobile application is higher for one version.

As an example, step 640 may include measuring the impact of engagement of end users with video embedded within the mobile application 401. If rules are established to collect analytics data regarding how often and how long end users interact with video in the mobile application 401, this data may be used to determine whether the video is worth keeping in the mobile application 401. Since video may be computationally intensive, it may be determined that video should be removed from the mobile application 401 to improve the mobile application's overall performance.

In step 645, results of the analysis may be used to determine whether the mobile application 401 may be optimized. For example, a computing device 101 may determine that one of the versions of the mobile application 401 used in a multivariate test has outperformed other versions by some predetermined degree such that it should be used exclusively going forward (or at least until further data is collected). In some embodiments, a computing device 101 may determine that aspects (e.g., background color, object placement/size, etc.) from one version of the mobile application 401 should be combined with aspects of another version of the mobile application to create an optimal version of the mobile application. Various thresholds may be used to determine whether optimization should be carried out. In some embodiments, a user (e.g., organization owning the mobile application) might not want to modify the mobile application 401 unless analysis of the analytics collected convincingly suggests that an optimal version of the mobile application 401 exists.

By way of example, a customer may implement a multivariate test (e.g., an A/B test) and set a certain value (e.g., 75%). When results of the test indicate that a version of the test has met the certain value (e.g., a layout results in 75% of the purchases), the mobile application may be optimized to use that version going forward. In other examples, a customer may establish thresholds based on multiple factors. For instance, a customer may require that the mobile application be optimized where the results of the test indicate a 5% increase in sales of a first product, but only where the sales of a second product have not decreased by more than 1%.

If it is determined that the mobile application may be optimized (Yes at step 645), mobile code files 427 and rule files 435 may be edited and/or generated at step 650. Step 650 may be performed automatically (without human intervention) by mixing and matching mobile code files 427 and rule files 435 of the different versions of the mobile application 401 used in a multivariate test to produce the optimal mobile application 401. For example, a rule file 435 that previously controlled deployment of an A/B test to a segment of the population may be updated so that the "optimal" or "winning" version of the A/B test is pushed out to the entire population. This may include selecting the "winning" mobile code files 427 so they may be injected into all instances of the mobile application 401. In some embodiments, optimization may also be achieved by updating one or more attributes of one or more constructs (e.g., unique classes) used in a multivariate test so that a "winning" version of the multivariate test is deployed to all end users.

Figure 7:
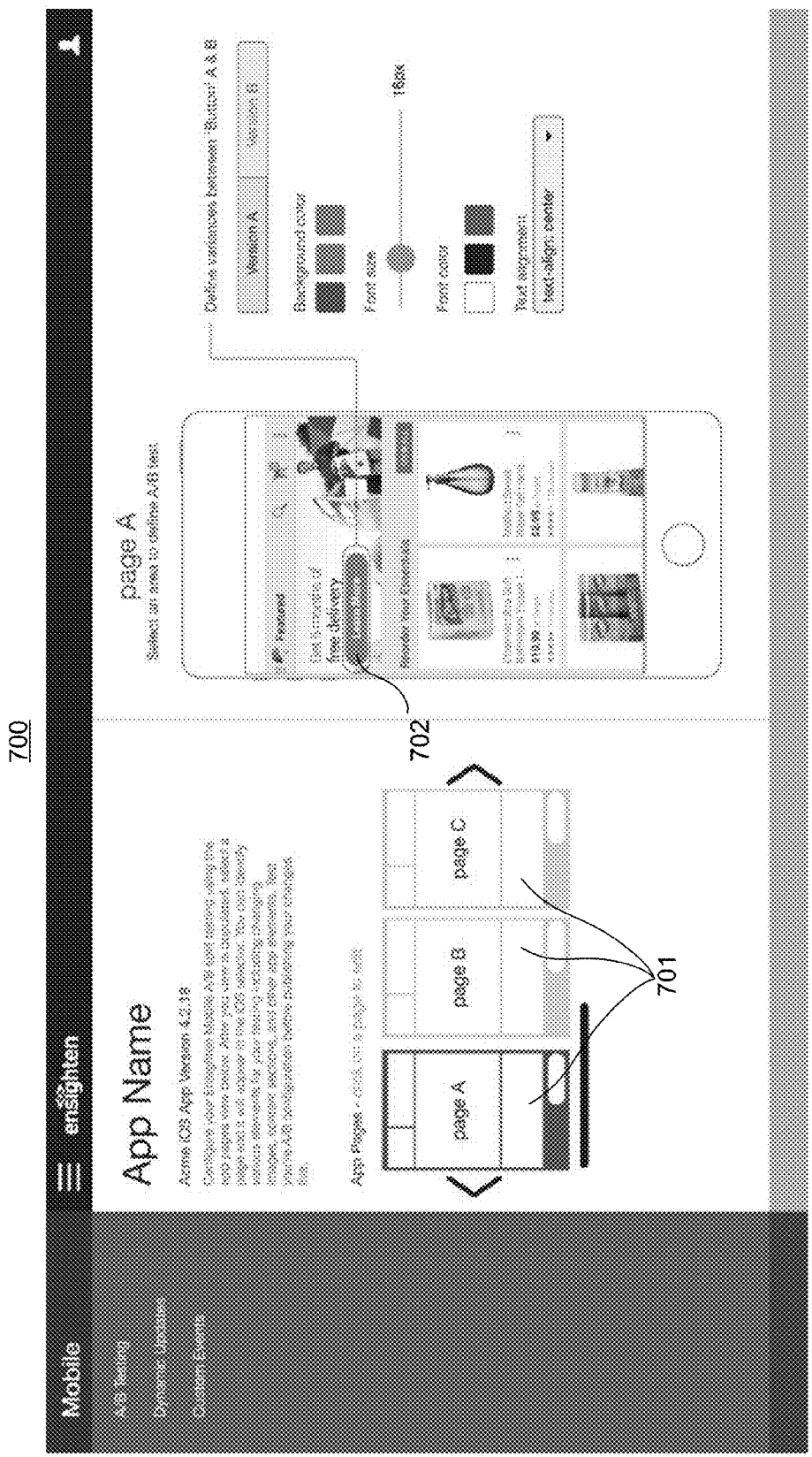
FIG. 7 is an illustrative user interface in accordance with various aspects of the disclosure.

FIG. 7 illustrates an example user interface 700 in accordance with aspects of the present disclosure. In particular, the user interface 700 may be used to establish (or define) an experiment (e.g., an A/B test, a multivariate test, etc.). The user interface 700 of FIG. 7 may be an example of a testing/content swapping user interface 415.

As shown in FIG. 7, the user interface 700 may allow a user (e.g., a customer of an entity, like Ensighten, that controls the TDN or personnel of an entity that controls the TDN) to select a page 701 in the mobile application 401 for which an A/B test may be created. The pages 701 available for selection may correspond to the screenshots 405 captured by the mobile library 403 as described above. In the example of FIG. 7, the user interface 700 shows that page A is selected as the page 701 of the mobile application 401 for which an A/B test is to be created. Details of the selected page 701 (here, page A) are therefore shown on the right side of the user interface 700.

The user may select various features of the selected page 701 that the user wants to modify for the A/B test. For example, the user may select buttons, links, text, images, and any other object on the page to modify. Selections may be made by pointing and clicking on a desired object. In the example of FIG. 7, the user interface 700 shows that the user has selected a button 702 (e.g., the "Learn More" button) as the subject of the A/B test. The user may then select which version (version A or version B) the user is going to create or define. In the example of FIG. 7, the user interface 700 shows that the user has selected to create version A. Next, the user may select various settings to control the appearance of version A of the button 702. As illustrated in FIG. 7, the user may select a background color of the button 702, a font size of the text in the button 702, a font color of the text in the button 702, and an alignment of the text in the button 702. In other embodiments, more or fewer settings may be available for defining the different versions. After the user creates settings for version A, the user may create settings for version B. Ultimately, the mobile API 409 and/or testing/content swapping API 411 may create mobile code files 427 based on the settings for the different versions. Each version may be associated with a separate mobile code file or a separate group of mobile code files. Alternatively, there may be some overlap such that one or more of the mobile code files include instructions for implementing both versions.

It should be understood that a wide variety of A/B tests and other multivariate tests may be created using a user interface like the one shown in FIG. 7. Examples of other A/B tests that may be implemented using aspects of the present application include: an A/B test to determine whether an organization gets more product purchases with the "buy now" button sitting at the top of the page versus the bottom of the page; an A/B test to determine whether an object gets more clicks with a first color button versus a second color button; an A/B test to determine whether more people purchase a product when the product content is shown on the left side versus the right side of the page; and an A/B test to determine whether more people indicate a product as being liked (e.g., "like" a product) when the product is shown with an image of a male versus a female. Further, examples of multivariate tests that may be implemented using aspects of the present application include: a multivariate test to determine which of six different page configurations results in the most reservations made; a multivariate test to determine which of five different product photos results in the product being added to a shopping cart.

Figure 8:
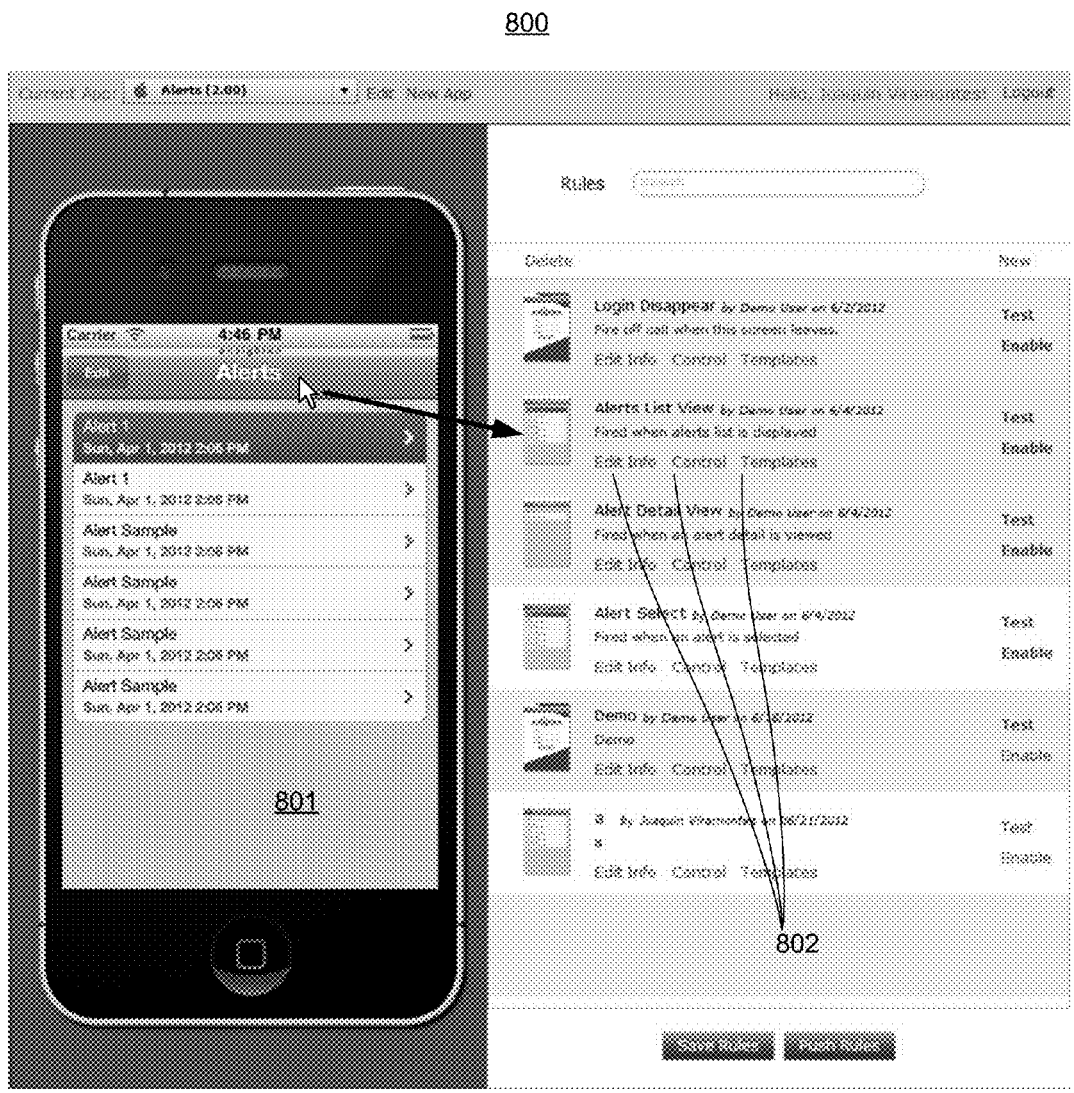
FIG. 8 is an illustrative user interface in accordance with various aspects of the disclosure.

FIG. 8 illustrates an example user interface 800 in accordance with additional aspects of the present disclosure. In particular, the user interface 800 may be used to create rules for collecting analytics when a user interacts with a mobile application. The user interface 800 of FIG. 8 may be another example of a testing/content swapping user interface 415.

As shown in FIG. 8, a user may create rules by pointing and clicking on pages and/or objects of the mobile application. In the example of FIG. 8, the user interface 800 shows that selection of the "Alerts List View" page of the mobile application causes the user interface 800 to generate a rule to fire a tag when the Alerts List View page is displayed. Further, as shown in FIG. 8, the user interface 800 may include options 802 for editing the metadata that is sent when the tag fires, controlling where and how the metadata is sent, and accessing templates to set further rules for responding to the firing of the tag.

Moreover, as illustrated in FIG. 8, multiple rules may be created by pointing and clicking on multiple objects within a page. When a user is done creating rules they may be saved for later editing and/or published to the TDN. By publishing the rules, a user may put the rules into effect so that when end users subsequently launch their mobile applications, the rules may be applied through the hidden browser 404.

Figure 9:
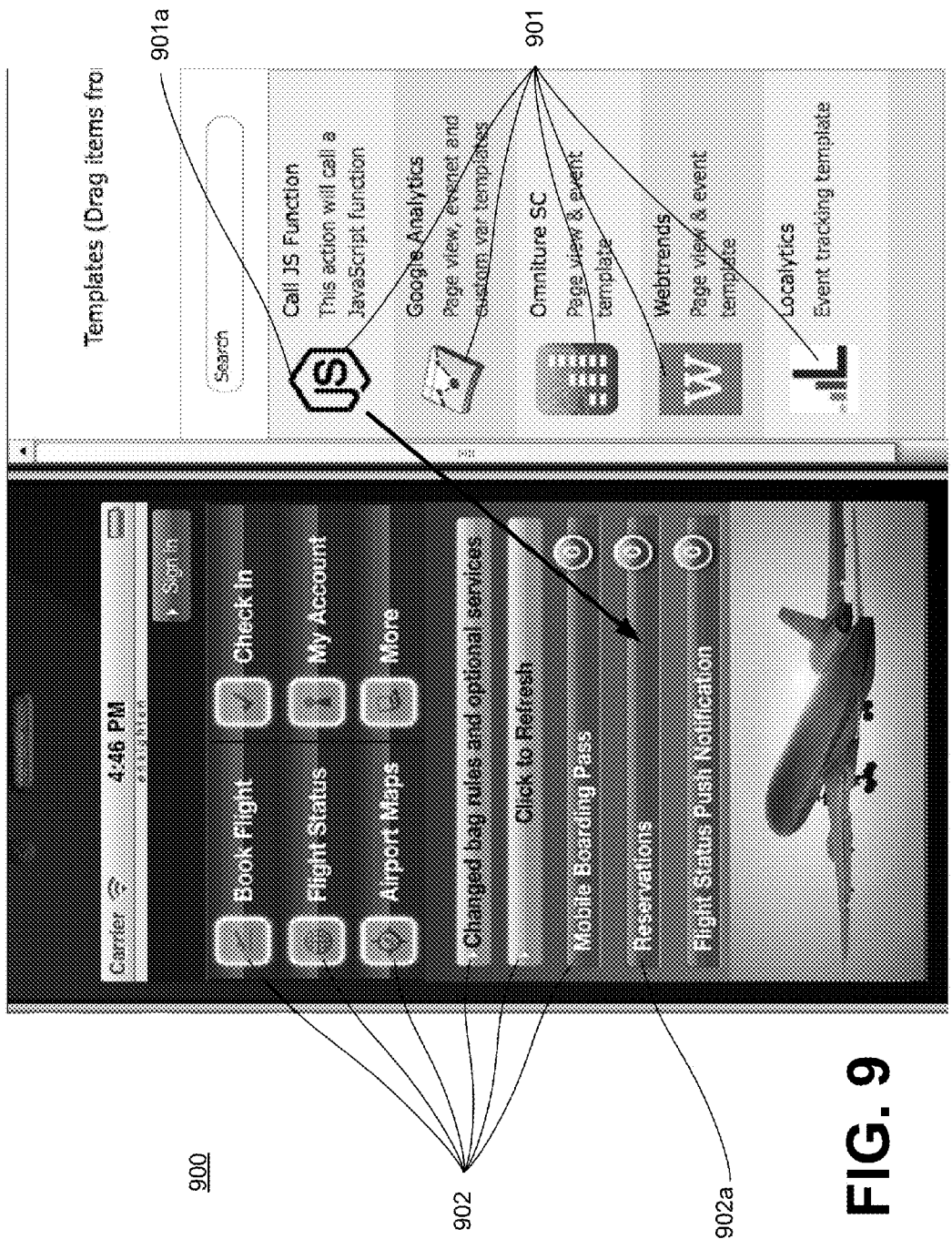
FIG. 9 is an illustrative user interface in accordance with various aspects of the disclosure.

FIG. 9 illustrates an example user interface 900 in accordance with aspects of the present disclosure. In particular, the user interface 900 may be used to set up templates for creating rules that collect analytics when a user interacts with a mobile application. The user interface 900 of FIG. 9 may be another example of a testing/content swapping user interface 415.

As shown in FIG. 9, a user may set up a template by dragging an icon on the right hand side of the user interface 900 and dropping the template on a page and/or object of the mobile application. The icons 901 may correspond to templates for setting up tags that have been pre-configured by various third party vendors (e.g., Google, Adobe, Webtrends, Localytics, etc.). In the example of FIG. 10, the user interface 900 shows that an icon 901a for a template to create a custom rule may be dragged and dropped on an object 902a of the mobile application. Although not shown, after the icon 901a is dragged and dropped onto the object 902a in the mobile application, a template may be presented to the user. The template may allow the user to create a rule related to the object 902a that the icon 901a was dropped on. For example, the template may allow the user to create a rule that changes the size, color, or style (or any other characteristic) of font in the object 902a or to call a function (e.g., JAVASCRIPT function) to fire a tag indicating that the object 902a has been selected in response to selection of the object 902a by an end user.

It should be understood that multiple icons 901 may be dragged and dropped on multiple objects 902. Moreover, the same icon 901 may be dragged and dropped on multiple objects 902 in the same page of the mobile application. Also, different icons 901 may be dragged and dropped on the same object 902. Where different icons 901 are dragged and dropped on the same object 902, multiple tags for the same object 902 may be created so that information may be sent to multiple third party vendors when an end user makes a single selection of the object 902 in the mobile application. When a user is done creating rules through the template, the rules may be saved for later editing and/or published to the TDN. By publishing the rules, a user may put the rules into effect so that when end users subsequently launch their mobile applications, the rules may be applied through the hidden browser 404.

Aspects of the disclosure are described herein in terms of illustrative embodiments thereof. Numerous other embodiments, modifications and variations within the scope and spirit of the recited disclosure will occur to persons of ordinary skill in the art from a review of this disclosure. For example, one of ordinary skill in the art will appreciate that the steps illustrated in the illustrative figures and described herein may be performed in other than the recited order, and that one or more illustrative steps may be optional in accordance with aspects of the invention. For example, referring to FIG. 5, step 510 may be performed before step 505. Also, for example, step 515 may be optional if some frameworks have already been added to the mobile application during its development.

What is claimed is:

1. A system, comprising:
a plurality of servers electrically connected to a network, wherein at least one server of the plurality of servers comprises a hardware processor and a non-transitory computer readable medium that stores computer-executable instructions and the at least one server:
communicates with a remote device executing a mobile application;
sends a tag container to a browser executed by the remote device, wherein a user interface of the browser is hidden from a user of the remote device, wherein the browser is generated by the mobile application in response to launching the mobile application on the remote device, and wherein the mobile application comprises a single line of code that, when executed by the remote device, initiates generation of the browser; and
in response to interpretation of the tag container by the browser, sends at least one file to the browser, the at least one file comprising instructions configured to cause the remote device to output one of a first version of the mobile application comprising a first version of an object and a second version of the mobile application comprising a second version of the object different from the first version of the object.

2. The system of claim 1, wherein the at least one file comprises rules that, when executed by the browser, determines which one of the first version of the mobile application and the second version of the mobile application is to be output, wherein the rules are configured to cause the browser to perform at least one of:
change a color of a background of the mobile application;
change a color of the object of the mobile application;
change a characteristic of a font used in the mobile application;
change a layout of a page in the mobile application; or
change a position of the object in the mobile application.

3. The system of claim 1, wherein the instructions are configured to cause the remote device to output one of the first version of the mobile application and the second version of the mobile application without changing compiled code of the mobile application.

4. The system of claim 1,
wherein the at least one server is further configured to evaluate results of a multivariate test, including the first version of the mobile application and the second version of the mobile application, to identify an optimal configuration of the mobile application, and
wherein the at least one file comprises a rule file that, when executed, determines which one of the first version of the mobile application and the second version of the mobile application is to be output based on the optimal configuration.

5. The system of claim 1, wherein at least one server of the plurality of servers is configured to provide an application programming interface that allows a user to establish a multivariate test.

6. The system of claim 1,
wherein the at least one server is further configured to send one or more tags to capture analytics regarding use of the mobile application, and
wherein at least one server of the plurality of servers is configured to receive the analytics from the mobile device and store the analytics.

7. The system of claim 1, wherein the instructions are configured to cause the remote device to modify an appearance of the mobile application based on a user profile associated with a user of the mobile application.

8. A method, comprising:
inserting code into a mobile application;
linking a library file to the mobile application; and
compiling, by a computing device, the mobile application after inserting the code and linking the library file to generate a compiled mobile application,
wherein the library file comprises at least one instruction that is executed in response to launching the compiled mobile application on a mobile device and, when executed, causes the mobile device to launch a browser that loads at least one file comprising instructions configured to cause the mobile device to output one of a first version of the mobile application comprising a first version of an object and a second version of the mobile application comprising a second version of the object different from the first version of the object,
wherein the browser is generated by the compiled mobile application in response to launching the compiled mobile application on the mobile device, and
wherein the at least one instruction comprises a single line of computer code that, when executed by the mobile device, initiates generation of the browser.

9. The method of claim 8, wherein the instructions of the at least one file are configured to cause the mobile device to output one of the first version of the mobile application comprising the first version of the object, the second version of the mobile application comprising the second version of the object, and a third version of the mobile application comprising a third version of the object.

10. The method of claim 8, wherein a user interface of the browser is hidden from a user of the mobile device.

11. The method of claim 8, wherein the library file comprises at least one instruction to capture at least one screenshot of the mobile application and transmit the at least one screenshot to a server.

12. The method of claim 8, further comprising:
accessing a user interface that establishes a multivariate test defining the first version of the mobile application and the second version of the mobile application.

13. One or more non-transitory computer readable storage media storing computer-executable instructions that, when executed by a computing device, cause the computing device to:
communicate with a mobile device executing a mobile application;
in response to a request from a browser, send a tag container to the browser, wherein a user interface of the browser is hidden from a user of the mobile device, wherein the browser is generated by the mobile application in response to launching the mobile application on the mobile device, and wherein the mobile application comprises a single line of code that, when executed by the mobile device, initiates generation of the browser; and
in response to a request from the tag container, send one or more files to the browser, the one or more files configured to output one of a first version of the mobile application comprising a first version of an object and a second version of the mobile application comprising a second version of the object different from the first version of the object.

14. The one or more non-transitory computer readable storage media of claim 13, wherein the one or more files are configured to cause the mobile device to output one of the first version of the mobile application and the second version of the mobile application without changing compiled code of the mobile application.

15. The one or more non-transitory computer readable storage media of claim 13, wherein the one or more files are configured to cause the mobile device to perform at least one of:
change a color of a background of the mobile application;
change a color of an object of the mobile application;
change a characteristic of a font used in the mobile application;
change a layout of a page in the mobile application; or
change a position of an object in the mobile application.

16. The one or more non-transitory computer readable storage media of claim 13, wherein the first version of the object comprises the object having a first color and wherein the second version of the object comprises the object having a second color different from the first color.

17. The one or more non-transitory computer readable storage media of claim 13, wherein the one or more files comprise at least one opcode that maps an event to at least one event handler function configured to collect analytics of a multivariate test and to fire a tag in response to use of the mobile application.

18. The one or more non-transitory computer readable storage media of claim 13, wherein the one or more files comprise code that is injected into the mobile application to modify an appearance of the mobile application based on a user profile associated with a user of the mobile application.

19. The system of claim 1, wherein the at least one file comprising instructions configured to cause the remote device to output one of the first version of the mobile application and the second version of the mobile application comprises instructions to inject non-native code into native code of the mobile application.

20. The system of claim 1, wherein the one of the first version of the mobile application and the second version of the mobile application to be output is selected at a runtime of the mobile application.

* * * * *